US011579841B1

(12) United States Patent
Eich et al.

(10) Patent No.: US 11,579,841 B1
(45) Date of Patent: Feb. 14, 2023

(54) TASK RESUMPTION IN A NATURAL UNDERSTANDING SYSTEM

(71) Applicant: Amazon Technologies, Inc., Seattle, WA (US)

(72) Inventors: Monty Eich, San Jose, CA (US); Clare Elizabeth Veladanda, Sunnyvale, CA (US); Shiladitya Roy, Bellevue, WA (US); Rohit Bhattacharjee, Vancouver (CA); Prashant Jayaram Thakare, Sammamish, WA (US); Nikhil Gupta, Shoreline, WA (US); Xu Zhang, Bothell, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/547,802

(22) Filed: Dec. 10, 2021

(51) Int. Cl.
| | |
|---|---|
| *G06F 3/048* | (2013.01) |
| *G06F 3/16* | (2006.01) |
| *G10L 13/00* | (2006.01) |
| *G10L 15/00* | (2013.01) |
| *G06F 9/48* | (2006.01) |

(52) U.S. Cl.
CPC ............ *G06F 3/167* (2013.01); *G06F 9/4881* (2013.01); *G10L 13/00* (2013.01); *G10L 15/00* (2013.01)

(58) Field of Classification Search
CPC ....... G06F 3/167; G06F 9/4881; G10L 13/00; G10L 15/00
See application file for complete search history.

(56) References Cited

U.S. PATENT DOCUMENTS

| | | | |
|---|---|---|---|
| 10,720,160 B2* | 7/2020 | Schramm | G10L 15/30 |
| 10,950,228 B1* | 3/2021 | Tan | G06F 3/167 |
| 11,145,295 B1* | 10/2021 | Kurhekar | G10L 13/00 |
| 11,295,735 B1* | 4/2022 | Anuar | G10L 15/30 |
| 11,461,221 B2* | 10/2022 | Muppalla | G06F 11/3664 |
| 2020/0302932 A1* | 9/2020 | Schramm | H04M 3/42212 |
| 2021/0090555 A1* | 3/2021 | Mahmood | G10L 15/1815 |
| 2021/0104235 A1* | 4/2021 | Radtke | G06F 16/3344 |

\* cited by examiner

*Primary Examiner* — David Phantana-angkool
(74) *Attorney, Agent, or Firm* — Pierce Atwood LLP

(57) ABSTRACT

A speech-processing system may provide access to one or more skills via spoken commands and/or responses in the form of synthesized speech. The system may be capable of keeping one or more skills active in the background while a user interacts (e.g., provides inputs to and/or receives outputs from) with a skill running in the foreground. A background skill may receive some trigger data, and determine to request the system to return the background skill to the foreground to, for example, request a user input regarding an action previously requested by the user. In some cases, the user may invoke a background skill to continue a previous interaction. The system may return the background skill to the foreground. The resumed skill may continue a previous interaction to, for example, to query the user for instructions, provide an update or alert, or continue a previous output.

20 Claims, 17 Drawing Sheets

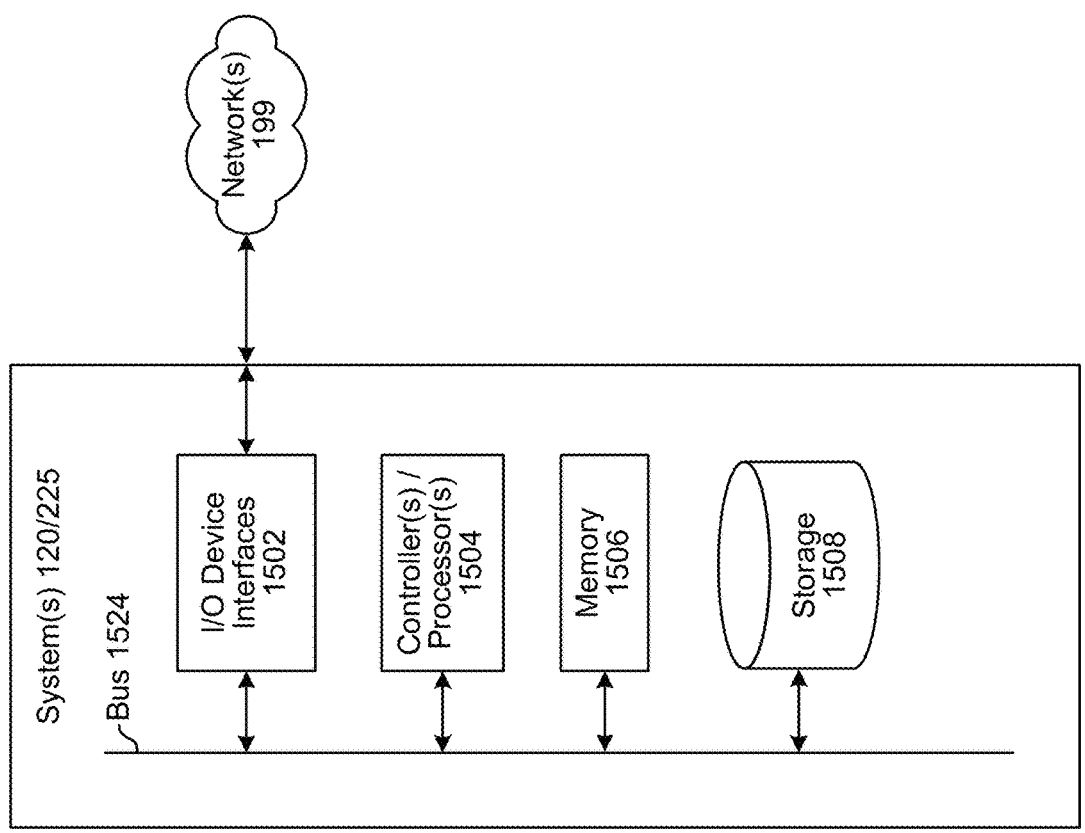

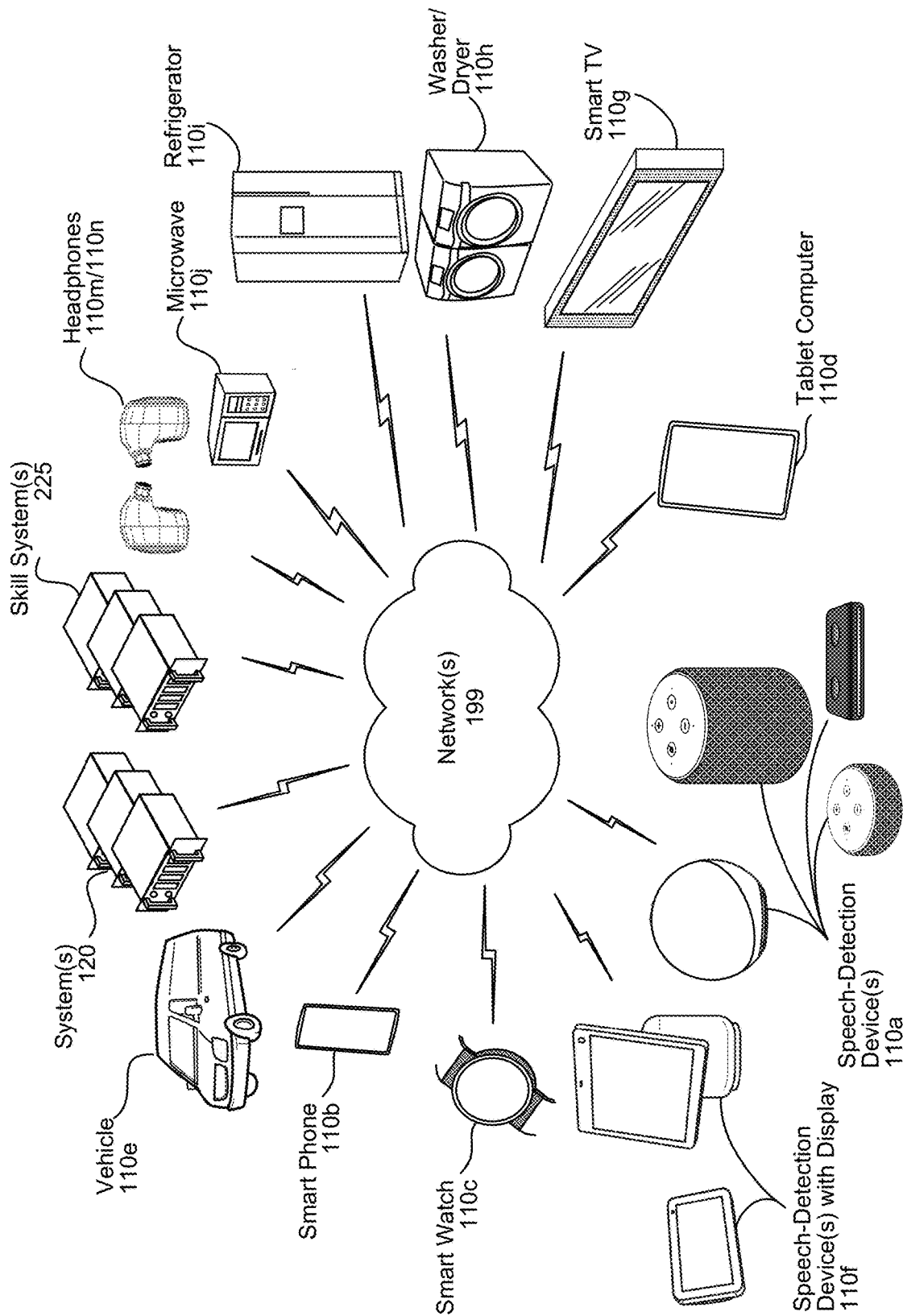

US 11,579,841 B1

TASK RESUMPTION IN A NATURAL UNDERSTANDING SYSTEM

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken inputs. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 15 is a block diagram conceptually illustrating example components of a system, according to embodiments of the present disclosure.

FIG. 16 illustrates an example of a computer network for use with the overall system, according to embodiments of the present disclosure.

DETAILED DESCRIPTION

Figure 1:
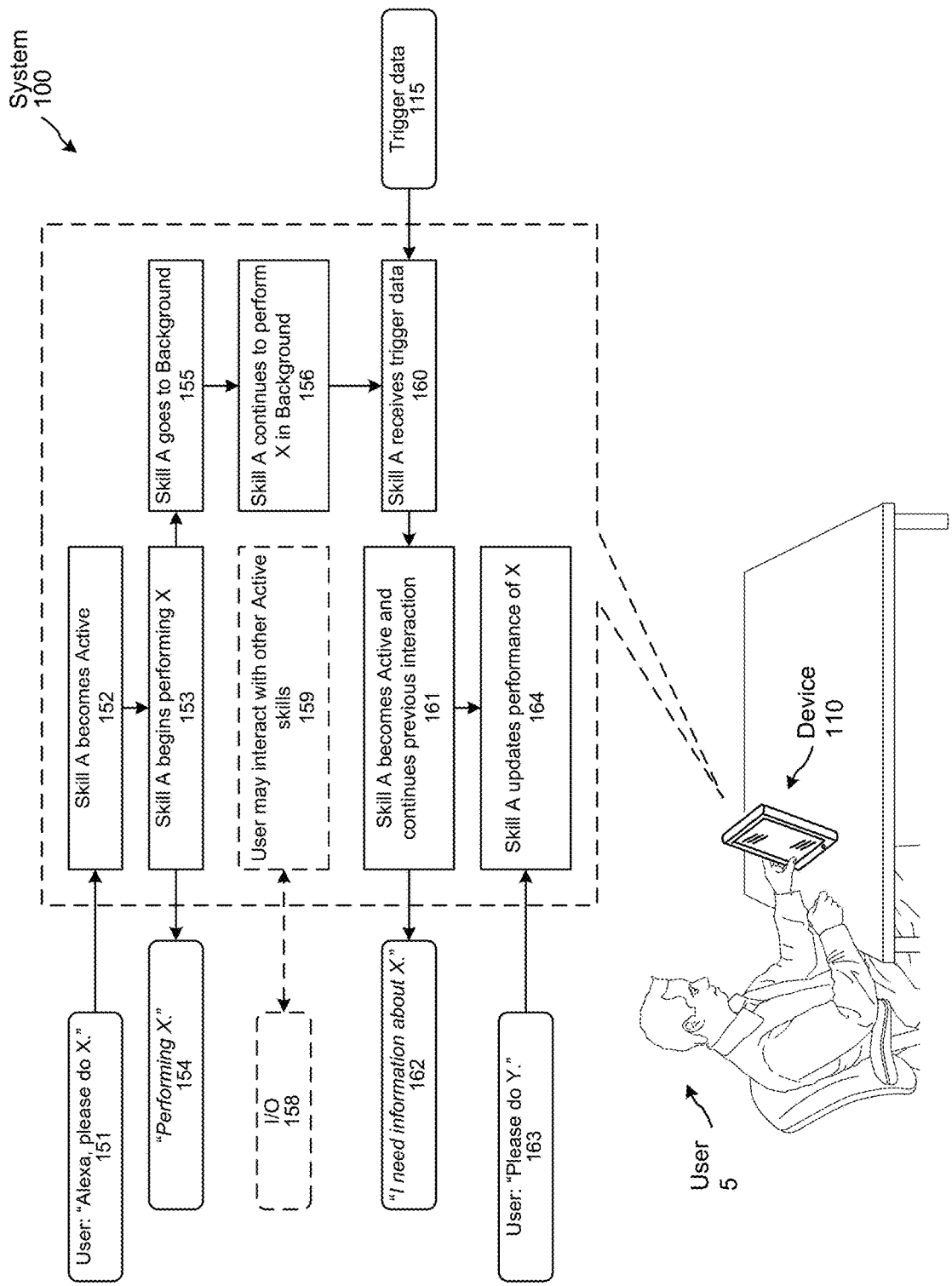
FIG. 1 is a conceptual diagram illustrating operation of a speech processing system employing skill resumption, according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other meaning representation of that speech. Similarly, natural language understanding (NLU) is a field of computer science, artificial intelligence, and linguistics concerned with enabling computers to derive meaning from text or other meaning representation input of natural language. ASR and NLU are often used together as part of a speech processing system, sometimes referred to as a spoken language understanding (SLU) system. Natural Language Generation (NLG) is a field of computer science, artificial intelligence, and linguistics concerned with producing a natural language output such phrases and sentences mimicking human language; for example, in the form of text. Text-to-speech (TTS) is a field of computer science, artificial intelligence, and linguistics concerning transforming textual and/or other data into audio data that is synthesized to resemble human speech. ASR, NLU, NLG, and TTS may be used together as part of a speech-processing system.

A user can speak to the speech processing system to interact with a skill. A skill may be software that enables the system to execute specific functionality to perform some action for and/or on behalf of the user. The system may be configured to function with multiple skills, including different skills having different functionality. Using the system's voice user interface (VUI), the user may interact with (e.g., provide natural language inputs to, and receive outputs from) a single skill at a time. A user may, however, wish to use various skills throughout the day. Thus, a skill currently in use may be said to be "active" or in the foreground. The system may allow a skill in an active state to receive input from the user and provide output to the user; for example, using the VUI. A skill that has completed an interaction with a user (e.g., that is not currently listening or providing output to the user) may be suspended or terminated. A suspended skill may not continue to perform processing on behalf of the user based on a previous request and may not have access to the VUI; e.g., a suspended skill may not resume as an active skill absent a user invocation. In some cases, however, the user may wish to resume a previous interaction with a skill; for example, to complete and/or modify an action previously requested.

Offered are systems and methods of task resumption in a speech processing system. The system may be configured with a "background" state in addition to active, suspended, and terminated states. A skill in a background state may continue to perform processing for a user based on a previous request, but may be inactive with respect to audio interactions with the speech processing system. The system may return a background skill to the foreground (e.g., to resume it as active with respect to audio interactions with the speech processing system) to continue a previous user interaction; for example, for the purpose of modifying, completing, and/or canceling a previously requested action. The system may resume the skill based on a user invocation and/or based on a proactive request from the skill. For example, a user may invoke a first skill to perform a first action. After invoking the first skill, the first skill may change its state to background. While the first skill is in the background, the user may invoke a second skill, which may then become the active skill. At a later time, the user or the first skill may request the system to resume the first skill (e.g., to return the first skill to an active state). For example, the first skill may request to be resumed based on, for example, receiving trigger data from a source external to the first skill; for example, GPS data from the device, an external update regarding the first action, etc. The trigger data may be related to the previously requested action. The system may determine to grant the request, and resume the first skill. The system may indicate to the user that the first skill has resumed; that is, that the first skill is now in the active state. The user may continue the previous interaction with the first skill to, for example, provide updated instructions related to the previous request. Thus, a skill in the background state may continue performing an action in response to a previous user request, receive data from and/or on behalf of the user related to the action, and request to resume as the active skill to interact with the user via the VUI to, for example, request user input regarding the action.

In some implementations, the system may allow/deny the request from the skill based on whether another skill is active (e.g., listening or speaking via the VUI), a priority of the respective skills, and/or whether or not an in-progress action is interruptible. For example, the system may prevent a background skill from resuming in a manner that would interrupt a user's phone call. In some implementations, the system may arbitrate when and which user data the device and/or system may share with the skills. For example, a user may specify whether a skill has access to data from the user device such as GPS data, sensor data, etc. These and other features of the disclosure are described in additional detail with reference to the accompanying drawings.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating operation of a speech processing system 100 employing skill resumption, according to embodiments of the present disclosure. As shown in FIG. 1, the speech processing system 100 may include a voice-enabled device 110, which may be in communication with a natural language command processing system 120 (abbreviated "system 120") connected across one or more computer networks 199 (as shown, for example, in FIG. 2). The device 110 may be, for example, one of the devices illustrated in FIG. 16. While the particular device 110 shown in FIG. 1 includes a display, the device 110 may a displayless device; for example, and without limitation, headphones 110m/110n, a vehicle-based device 110e, a smart watch 110c, etc. Although the figures and description of the present disclosure illustrate certain steps in a particular order, the steps described may be performed in a different order (as well as certain steps modified, removed, and/or added) without departing from the present disclosure.

A user 5 may access the system 100 via the device 110. The system 100 may provide the user 5 access to one or more virtual assistants, and a virtual assistant may provide the users 5 with access to the functionalities of one or more skills. The user 5 may interact with the device 110, and thus the skills, using a VUI. For example, the user may provide input in the form of a spoken command, and the device 110 may return output in the form of synthesized speech. In some cases, the device 110 may provide the user 5 with access to multiple skills. Due to the nature of a VUI, however, the system 100 may provide the user with access to a single skill at a time; for example, to enable the user 5 to know which skill he/she is using at any given time, and/or to prevent multiple skills from receiving a same user input intended for only one of the skills.

In some cases, the user 5 may interact with different skills at different times. For example, a user may hail a car using a rideshare skill, and switch to a music streaming skill to play music while awaiting the car. In this example, the user 5 may wish to invoke the second skill without terminating the first skill so that the first skill may resume (e.g., so the user 5 may check the status of the car, or so the skill can request a user input) without having to start a new interaction with the first skill. In some cases, the first skill may receive trigger data 115 (e.g., from a source external to the skill) regarding an action being performed for the user by the first skill.

Figure 2:
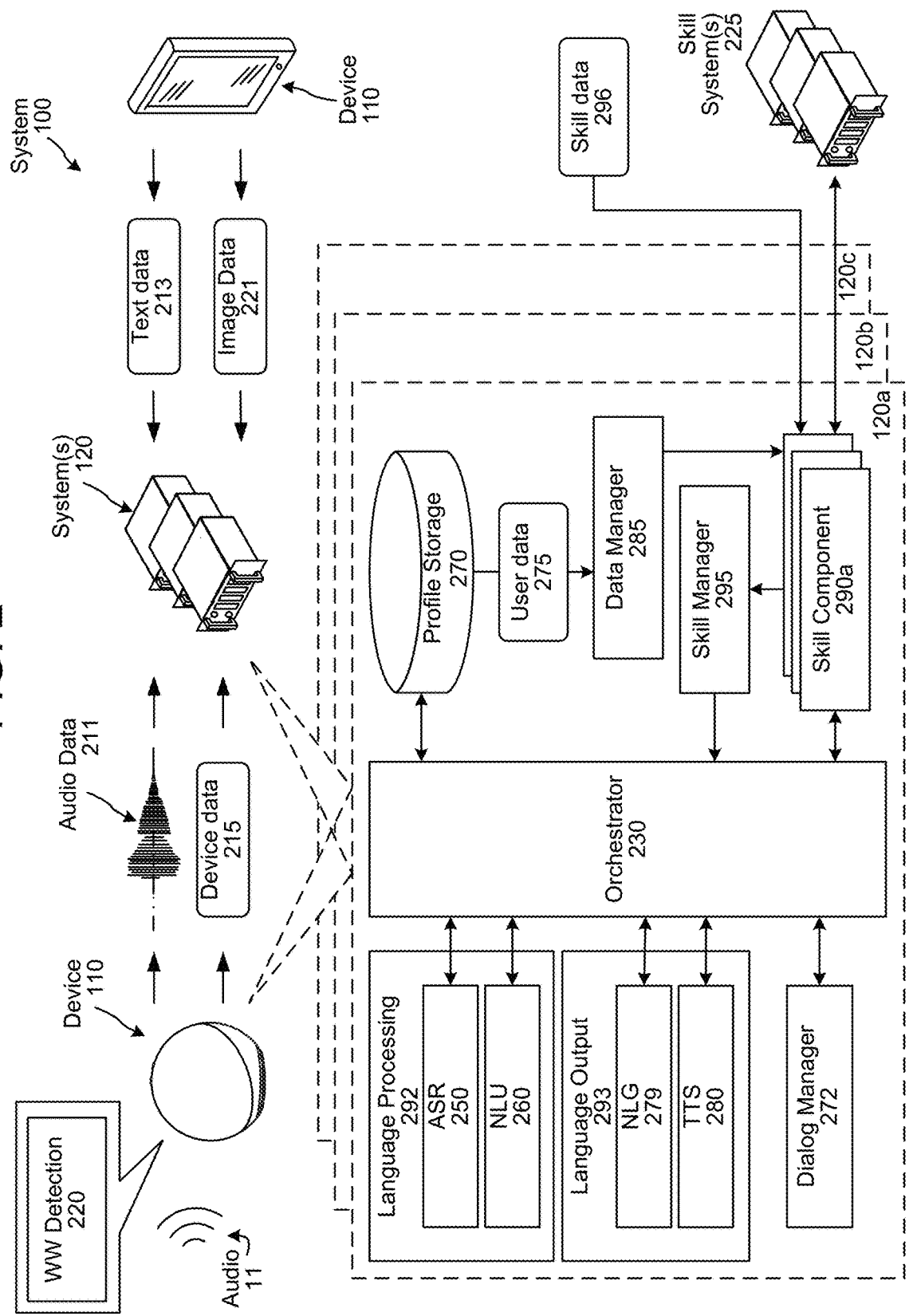
FIG. 2 is a conceptual diagram illustrating components of the speech processing system, according to embodiments of the present disclosure.

The trigger data 115 may be day from the user 5, device 110, the system 120, a skill support system 225 (as shown in FIG. 2), a different skill, etc. For example, trigger data 115 from the device 110 may include sensor data, location data, input data (e.g., touch or speech interaction), and/or a change in device state (e.g., restart or failed login). In some cases the trigger data 115 may be from a second device 110 that may or may not belong or be associated with the same user 5. The trigger data 115 may be from one or more smart-home devices, such as data pertaining to an electronic lock, light, environmental controls, alarm, camera, and/or other sensors. The trigger data 115 may pertain to an access of user 5 data by another user, such as opening and/or editing a shared document, input to a shared app such as a shopping list or child care app, etc. The trigger data 115 may be from another skill and/or third-party data provider, such as weather, financial information, sports scores, news alerts, etc.

Returning to the rideshare example, the rideshare skill may receive data that a car hailed for the user has been delayed. The skill may determine to request that the system 100 resume the skill (e.g., return it to the foreground) to allow the skill to request user input regarding the action. If granted, the device 110 may output synthesized speech representing a notification or question to the user. The device 110 may receive the user's response, and provide response data to the skill. The skill may terminate, modify, augment, and/or replace performance of the action based on the response data.

FIG. 1 illustrates such an example of task resumption in the speech processing system 100. The user 5 may, at a stage 151, invoke a first skill (Skill A). For example, the user 5 may utter a spoken command to the device 110, such as "Alexa, please do X." The first device 110 may receive the audio representing the user's voice, and the device 110 and/or the system 120 may perform speech processing (e.g., using the language processing components 292 described herein) to determine command data (e.g., intent and/or entity data) represented in the user's speech. Based on the command data, the system 100 may determine that the spoken command corresponds to Skill A. Upon determining that the user 5 is invoking Skill A, the system 100 may, at a stage 152, make Skill A active. In some cases, the user 5 may provide other input additionally and/or alternatively to uttering the spoken command; for example, by inputting text data, image data, making selections from menus of a graphical user interface (GUI), etc. The system 100 may send the command data to a skill component corresponding to Skill A (e.g., one of the skill components 290 and/or skill support systems 225 described herein) for processing.

Skill A may, at a stage 153, may begin performing the requested command. Skill A may perform an action for or on behalf of the user 5. For example, Skill A may return response data to the device 110. The system 100 may, at a stage 154, cause the device 110 to present output representing the response data to the user 5; for example, in the form of synthesized speech ("Performing X."), streaming media, etc.

Following the output at the stage 154, the system 100 may, at a stage 155, change Skill A's state to background; that is, set Skill A's state to be inactive with respect to audio interactions with the system 100/device 110. While Skill A continues, at a stage 156, to perform the action in the background state, the user 5 may, at a stage 159, interact with other skills; for example, by invoking a second skill. While in the active state, the second skill may, at a stage 158, interact with the user 5; for example, via the VUI.

While Skill A is in the background state, the system 100 may, at a stage 160, receive and/or determine trigger data 115. The trigger data 115 may relate to the first action (or a related action) being performed by Skill A. The trigger data 115 may originate from the user 5, the device 110, the system 120, a skill support system 225, and/or another external device and/or system. The trigger data 115 may relate to a status or condition of the user 5, a status and/or condition of the device 110, and/or performance of the first action.

Skill A may, based on the trigger data 115, request that the system 100 return it to the active state; that is, allow it to resume even in absence of a user invocation. The system 100 may grant/deny the request based on various factors related to a priority of Skill A and/or a currently active skill, whether a second action is in progress, and/or whether the currently active skill and/or the second action are interruptible (e.g., streaming music may be designated as interruptible, but real-time communication such as a phone or video call may not). If the request is granted, the system 100 may, at a stage 161, allow Skill A to resume in the active state such that the user 5 and Skill A may continue the previous interaction (e.g., relating to the first action). Skill A may then request user input regarding the first action; for example, to provide instructions and/or make a selection regarding performance of the first action by Skill A.

The system 100 may, at a stage 162, cause the device 110 to present an output representing the request for user input. For example, the system 100 may cause the device 110 to output synthesized speech in the form of a question or request for instructions (e.g., "I need information about X."). In some implementations, the system 100 may cause a different device from the one that received previous user inputs to present the output; for example, the user 5 may invoke Skill A from an at-home speech-detection device 110a, and later receive the request from Skill A while traveling in a vehicle 110e. In any case, the user 5 may, at a stage 163, provide a response to Skill A's inquiry (e.g., "Please do Y."). The system 100 may process the user's response and provide the responsive data to Skill A. Skill A may, at a stage 164, terminate, modify, augment, and/or replace performance of the first action based on the responsive data.

Further examples of VUI inputs and outputs of the system 100 when resuming background skills are illustrated in FIGS. 4 through 8 and described below.

FIG. 2 is a conceptual diagram illustrating components of the speech processing system 100, according to embodiments of the present disclosure. As in FIG. 1, FIG. 2 illustrates a system 100 including one or more devices 110, one or more systems 120a, 120b, and 120c (collectively "systems 120"), and one or more skill support systems 225. As further illustrated in FIG. 2, components of the system 100 such as the language processing components 292, language output components 293, skill components 290, etc., may be in one of the devices 110, one of the systems 120, shared between a device 110 and system 120, or in both a device 110 and system 120. Functionalities of the skill components 290a, 290b, and/or 290c (collectively, "skill components 290") may be performed with the assistance of one or more skill systems 225, which may be physically distinct from the device 110 and/or system 120.

The device 110 may receive audio 11, and perform audio processing using, for example, the wakeword detection component 220, to determine whether the audio 11 includes system-directed speech. Upon detecting system directed speech (e.g., either by detecting a wakeword, receiving a gesture such as a button press, etc.), the system 100 may begin generating and processing audio data 211. In addition, the system 100 may receive and process text data 213 (e.g., as entered by a user on a keyboard or touchscreen), image data 221 (e.g., received by a camera of the device 110), and/or other device data 215 (e.g., sensor data and/or data regarding a status or condition of the user 5 and/or device 110).

Upon detecting speech in the audio data 211, the system 100 may process the audio data 211 using the language processing components 292 to, for example, perform ASR, NLU, and/or entity resolution as described in further detail below. The system 100 may determine command data representing, for example, one or more intents and/or entities represented in the audio data 211. The system 100 may, based on the command data, identify a skill component 290 for performing an action responsive to the command data. The system 100 may send the command data to the skill component 290 via, for example, the orchestrator component 230. The skill component 290 may perform an action and/or generate response data based on the command data. The skill component 290 may return the response data to the orcestrator component 230. The orcestrator component 230 may send the response data to the language output components 293, which may perform NLG and/or TTS to generate synthetic speech representing the response data. The system 100 may cause the synthetic speech to be output by a speaker of the device 110.

The system(s) 100 may include a dialog manager component 272 that manages and/or tracks a dialog between the user 5 and device 110. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog. In some implementations, the dialog manager component 272 may maintain a dialog for each skill with which the user interacts. In some implementations, the dialog manager component 272 may maintain a dialog that involves user interaction with multiple skills.

The profile storage 270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. If a user moves to a second device (e.g., when leaving from home and getting into a vehicle 110e), the user profile may be updated to include information that a new device 110 is active with respect to the user profile. Thus, when a skill attempts to resume a previous dialog with a user, the system 100 may direct output from the skill to whichever device(s) is/are currently active with respect to the user profile. Each user profile may include identifiers of skills that the user has enabled. When a user enables a skill, the user is providing the system 100 with permission to allow the skill to execute with respect to the user's natural language user inputs. If a user does not enable a skill, the system 100 may not invoke the skill to execute with respect to the user's natural language user inputs.

The user profile may include user selections and/or settings regarding whether user data 275 may be made available to skills. Settings regarding sharing of user data 275 with skill may be different for different skills. For example, a user may grant a fitness skill access to fitness tracker information (heartrate, steps, etc.) and/or location data. The user may, however, deny other skills access to this data. In another example, a user may grant a social media skill access to image files on the device, but deny file access to, for example, the fitness skill. The user data 275 may further include other information about the user, such as billing information for purchases made using skills, address information, vital statistics, etc. A user profile may, by default, deny access to all user data 275 to a skill unless the user specifically grants such access.

The data management component 285 may work in conjunction with the profile storage 270 to provide the skill components 290 with access to the user data 275 (or, depending on user permissions and/or system policies, prevent access to the data). In some implementations, the data management component 285 may receive a request for user data from a skill component 290 and, based on a user profile associated with the user data requested, determine whether or not to provide the requested user data 275 from the profile storage 270 (or other source, such as telemetry from sensors of the device 110). In some implementations, a skill component 290 may subscribe to user data updates from the data management component 285. The data management component 285 may, based on user permissions and/or system policies, provide the subscribing skill component 290 with user data 275 updates as they occur. The user data 275 updates may include data from the device 110 and/or the profile storage 270. For example, the user data 275 may include sensor information from the device 110 and or other devices in communication with the device 110. For example, the user data 275 may include location data, temperature data, vibration data, acoustic event data, fitness tracker data, proximity data representing detection of signatures of nearby devices in proximity to the device 110, user recognition and/or presence data, etc. The user data 275 may include sensor information or other data from a different device 110 that may or may not be associated with a same user profile. The skill component 290 may, based on a received user data 275 update, request that the system 100 resume the skill to, for example, obtain user input with regard to an action being performed or to be performed by the skill.

The skill manager 295 may perform functions related to skill states, such as transitioning skills between states, handling requests for skills to change state (e.g., requests to make a skill active), and/or store information regarding skills' respective states (e.g., active, background, suspended, terminated, etc.). The skill manager 295 may also store information related to actions being performed by a skill, such as whether an action is still in progress. The skill manager 295 may further provide information to other components of the system 100 such as the orcestrator component 230, language processing components 292, etc., regarding skill states. For example, when the system 100 receives a natural language command or request, the system 100 may use data regarding skill states as context for processing the input; for example, by ranking natural language hypotheses based in part on which skills are active, backgrounded, etc.

The skill manager 295 may arbitrate a skill's state transitions. For example, the skill manager 295 may determine (e.g., based on user 5 permissions and/or system 100 policies) whether states may run in a background state. The skill manager 295 may approve a skill's request to transition to a background state to allow the skill to, for example, continue performing an action on behalf of the user. A skill operating in a background state may, subject to user permissions and/or system 100 policies enforced by the data management component 285, receive data pertaining to the user and/or an action the skill is performing on behalf of the user. Such data may be the trigger data 115. Upon receiving the trigger data 115, a skill may send a request to the skill manager 295 to resume as the active skill to, for example, use the VUI to request user input regarding the action. In contrast, if the skill manager 295 determines that a skill does not have permission to run in the background, the skill manager 295 may only permit a transition to a suspended or terminated state. A skill that has been suspended by the skill manager 295 may continue performing certain operations on for/on behalf of the user, such as streaming media, maintaining a timer, pushing notifications, etc. The data management component 285 may not, however, grant a suspended skill access to user data and/or device data. And the skill manager 295 may not grant a suspended skill access to the VUI to, for example, send or receive natural language messages unless the user explicitly (or implicitly) invokes the skill first. In some implementations, the skill manager 295 may terminate skill activity (e.g., change a skill state to "terminated") with respect to a particular user and/or action depending on certain conditions; for example, settings regarding a duration of time a skill may remain active in absence of a user invocation.

The skill manager 295 may handle requests from skills to resume as the active skill; for example, based on received trigger data 115. In some implementations, the skill manager 295 may expose an application programming interface ("API") to which a skill component 290 may send requests. A skill component 290 may send a request to the skill manager 295 to ask that the system 100 resume a skill to, for example, obtain user input with regard to an action being performed or to be performed by the skill. The skill component 290 may make the request based on trigger data 115; for example, skill data 296, user data 275, etc. The skill data 296 may be data relevant to the skill and/or an action being performed by the skill. The skill data 296 may originate from a source external to the device 110/system 120; for example, from a skill support system 225. The skill data 296 may, for example, indicate a change in conditions relating to execution of an action performed by the skill that may already be in progress.

In some implementations, the skill manager 295 may determine how to handle skill state transitions based on, for example, user permissions in the profile storage 270 and/or system 100 policies. For example, a user may adjust settings associated with their user profile in order to allow or forbid individual skills and/or all skills from running in a background state. In some implementations, the skill manager 295 may grant or deny the skill's request to resume based on, for example, user permissions in the profile storage 270 and/or system 100 policies.

In some implementations, the skill manager 295 may grant/deny a skill's request to resume based in part on a priority of an active skill and/or a particular action the skill is performing versus a priority of the requesting skill. Different skills and/or actions may be ascribed different priorities, and the skill manager 295 may grant/deny a request to foreground based on the respective priority of the requesting skill and current foreground skill. The skill manager 295 may store metadata for a skill that may indicate, for example, priorities for the skill and/or an action or actions that it may perform. In some implementations, the priority may be user configurable. For example, one user may set their preferences to allow a skill to resume as active, while another user may forbid a skill from resuming unless explicitly invoked. In some cases, the request may have a priority, and request itself may have an assigned priority (e.g., normal, urgent, emergency, etc.). Thus, a higher priority request/requesting skill may be granted a request to foreground over an action/skill having a lower priority. In some cases, an action currently being performed by the foreground skill may be categorized as interruptible or uninterruptible. For example, streaming media may be designated as an interruptible action while real-time voice and/or video communication may be designated as uninterruptible. In some cases, an uninterruptible action may be uninterruptible for low priority requests/requesting skills, but the skill manager 295 may nevertheless grant a high priority request. If the skill manager 295 grants a skill its request to resume as the foreground skill, the system 100 may cause the device 110 to present an output as generated by the corresponding skill component 290 (e.g., with assistance of the language output components 293 to generate synthesized speech).

Figure 8:
FIG. 8 illustrates first example inputs and outputs of a voice user interface of the speech processing system listing active skills, according to embodiments of the present disclosure.

In some implementations, the skill manager 295 may provide the system 100 and/or the user 5 with the state information of various skills as shown in FIG. 8. A user 5 may ask the system 100 (e.g., using a natural language input) which skills are currently running. The system 100 may process the input and determine skill state information from the skill manager 295. The system 100 may generate a natural language output to respond to the user with information regarding which skills are active and/or backgrounded.

Figure 3:
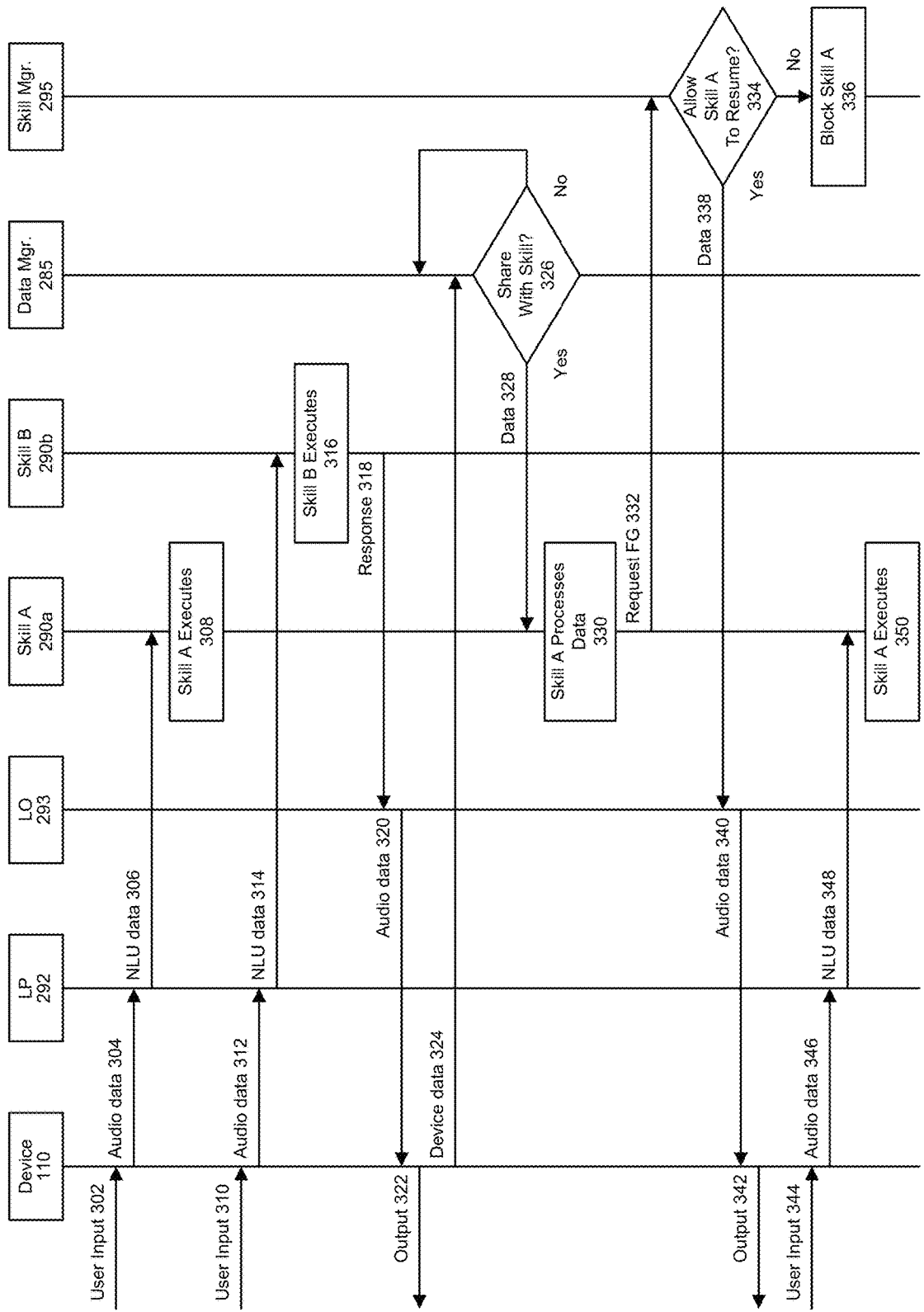
FIG. 3 is a signal flow diagram illustrating an example of resuming a skill in the speech processing system, according to embodiments of the present disclosure.

FIG. 3 is a signal flow diagram illustrating an example of resuming a skill in the speech processing system 100, according to embodiments of the present disclosure. FIG. 3 illustrates data shared between various components of the system 100 including the device 110, the language processing components 292, the language output components 293, a first skill component 290a (corresponding to Skill A), a second skill component 290b (corresponding to Skill B), the data management component 285, and/or the skill manager 295. Although represented separately in the diagram, the various components may all reside within the device 110, in a system 120, and/or split/duplicated between the device 110 and system 120.

The device 110 may receive a user input (302). The device 110 may, upon detecting a wakeword and/or some other indication to begin processing speech, generate audio data and send (304) the audio data to the language processing components 292. The language processing components 292 may perform ASR, NLU, and/or entity resolution in the audio data, identify a skill for executing with respect to NLU results data generated by the language processing components 292, and send (306) the NLU results data to the skill component 290a corresponding to the identified skill (in this case, Skill A). Once Skill A is identified as corresponding to the NLU results data, the system 100 (e.g., the skill manager 295) may make Skill A the foreground skill. Skill A may execute (308) with respect to the NLU results data by performing an action for or on behalf of the user. In some cases, Skill A may generate an acknowledgement or other output related to performance of the action (not shown). In some implementations, the skill manager 295 may change Skill A's 290a state to background (e.g., inactive with respect to audio interactions with the system 100/device 110) following the user input and an output acknowledgment, if one is made. In some implementations, the skill manager 295 may change Skill A's 290a state according to user preferences/permissions. For example, the user may grant/deny permission to an individual skill and/or all skills to run in the background. If the user profile data indicates that Skill A may run in the background, the skill manager 295 may change Skill A's 290a state to background following an output to the user. In contrast, if user profile data indicates that a skill may not run in the background, the skill manager 295 may change a skill's state to "suspended" following an output to the user.

The device 110 may receive a second input (310), generate audio data, and send (312) the audio data to the language processing components 292. The language processing components 292 may perform speech processing on the audio data to generate second NLU results data, and send (314) the results data to Skill B for further processing. Once Skill B is identified as corresponding to the second NLU results data, the system 100 may make Skill B the foreground skill (e.g., active with respect to audio interactions with the system 100/device 110) and move Skill A to the background. Skill B may execute (316) with respect to the second NLU results data by performing another action for or on behalf of the user. Skill B may generate a response (e.g., an acknowledgement or other output related to performance of the second action). The response may be a message for output to the user as, for example, synthesized speech. Accordingly, Skill B may send (318) response data to the language output components 293. The language output components 293 may generate synthesized speech representing the response generated by Skill B. The language output components 293 may send (320) audio data representing the response to the device 110, and the device 110 may output (322) audio corresponding to the audio data. In some cases, the second action may be an online purchase made on behalf of the user, and the response data may be an acknowledgement or confirmation of the purchase. In some cases, the second action may be streaming media such as music, a video, a podcast, etc. In such cases, the response data may represent the media itself, and may be sent directly to the device 110 for output (e.g., bypassing the language output components 293).

At some point, the system 100 may receive some data related to the first action and/or Skill A. In the example shown in FIG. 3, the data may be device data received (324) from the device 110. The received data may be, for example, the user data 275; for example, detection of a nearby second device as identified using a unique signature such as a universally unique identifier (UUID) detected or otherwise received via a wireless signal (e.g., Bluetooth or near-field communication) or wired connection between the devices 110. The data management component 285 may receive the device data and determine (326) whether user permissions and/or system policies allow Skill A access to the device data. If not ("no" at 326) the data management component 285 may block the skill component 290a from receiving the data. If the data management component 285 determines that Skill A is permitted to receive the device data ("yes" at 326), the data management component 285 may send (328) the device data to Skill A (e.g., the first skill component 290a).

Skill A, upon receiving the device data, may process (330) the data and determine to request that the system 100 resume Skill A as the foreground skill; for example, so Skill A may request additional input from the user. Skill A may send (332) to the request to the skill manager 295 which may, based on user permissions and/or system policies, determine (334) whether to allow Skill A to resume as the foreground skill. If not ("no" at 334), the skill manager 295 may block (336) Skill A's request. The block may be temporary—that is, the skill manager 295 may grant the request following completion of the second action by Skill B; for example, by scheduling Skill A's request, and notifying Skill A when it may resume. In other cases, Skill A may submit one or more additional requests, which may be granted; for example, depending on a status of the second action and/or Skill B.

If the skill manager 295 grants Skill A's request to resume ("yes" at 334), the system 100 may make Skill A the foreground skill (e.g., set its state to active), and Skill B a background skill (e.g., set its state to inactive with respect to audio interactions with the speech processing system). The skill manager 295 may send (338) data from Skill A to the language output components 293 for processing. In some implementations, Skill A may send the data directly to the language output components 293 upon grant of the request. Skill A may generate output (e.g., a question or request for instructions related to performance of the first action). The language output components 293 may generate synthesized speech representing the output generated by Skill A. For example, the synthesized speech may represent a request for user input regarding the first action. The language output components 293 may send (340) audio data representing the synthesized speech to the device 110, and the device may present (342) the output to the user.

The device 110 may receive a third user input (344). The third user input may be the user's response to the output presented to the user at the stage 342. The device 110 may send (346) corresponding audio data to the language processing components 292, which may process the audio data and send (348) resulting NLU results data to Skill A. Skill A may use the NLU results data to terminate, modify, augment, and/or replace execution (350) of the first action based on the user's response to the request for user input. FIGS. 4 through 8 below illustrate various example user experiences related to foregrounding and backgrounding skills.

Figure 4:
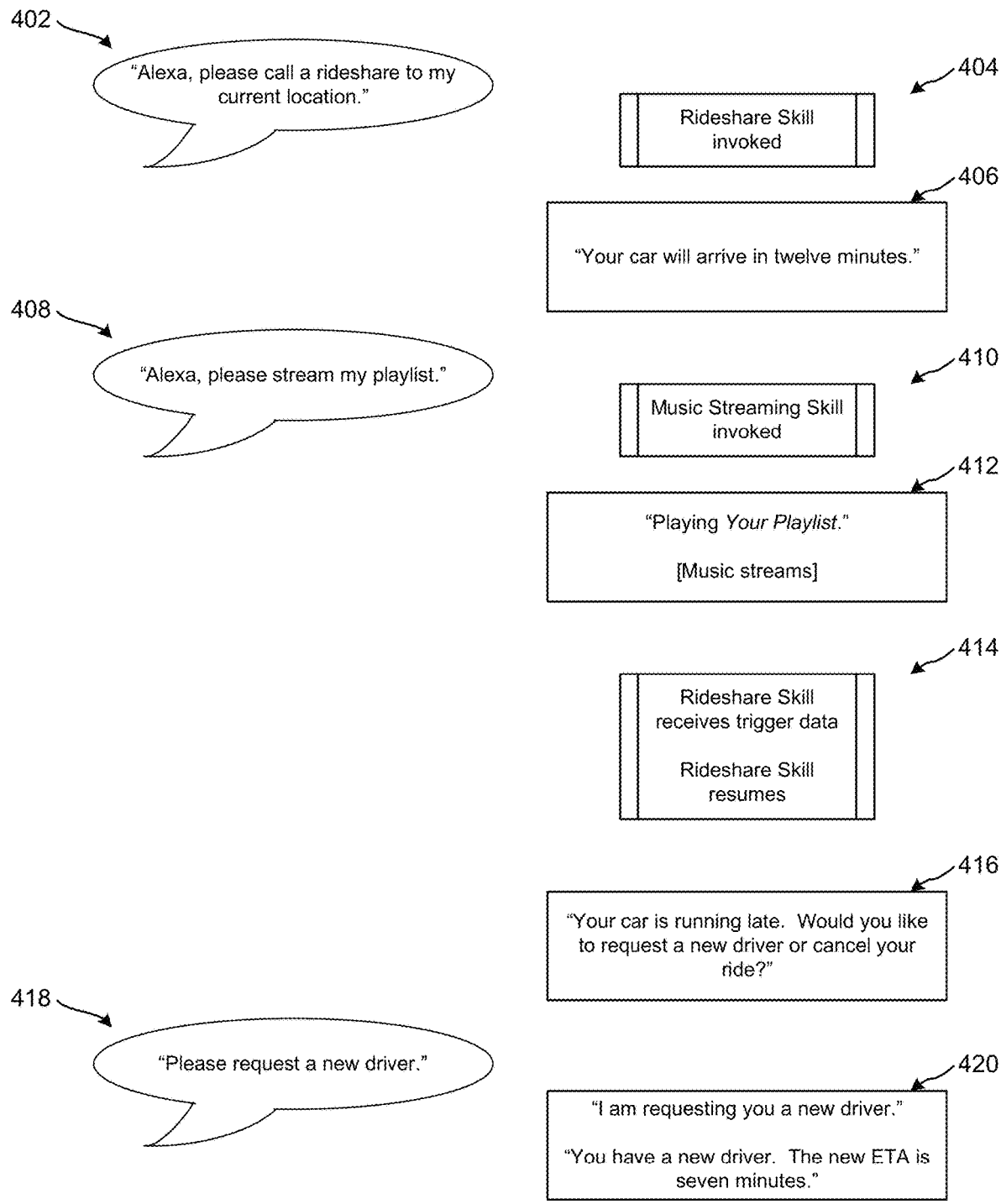
FIG. 4 illustrates first example inputs and outputs of a user interface of the speech processing system when resuming a background skill based on skill data, according to embodiments of the present disclosure.

FIG. 4 illustrates first example inputs and outputs of a user interface of the speech processing system 100 when resuming a background skill based on skill data, according to embodiments of the present disclosure. A user 5 interacting with a VUI of the system 100 (e.g., via a speaker and microphone of a device 110) may exchange the illustrated messages.

At a stage 402, the user may call on Alexa to invoke a rideshare skill with the following utterance: "Alexa, please call a rideshare to my current location." The system 100 may process the utterance and, at a stage 404, invoke the rideshare skill. The system 100 may make the rideshare skill the foreground skill. Any other active skill may be moved to the background. The rideshare skill may process the command and arrange a car to pick up the user at a location determined based on, for example, a location service of the device 110. The rideshare skill and/or language output components of the system 100 may generate a confirmation message to the user. For example, the rideshare skill may cause the device 110 to output, at a stage 406, the message: "Your car will arrive in twelve minutes." In some implementations, the skill manager 295 may, subject to user permissions and/or system policies, set the rideshare skill's state to "background" following the output.

Sometime later, the user may call on Alexa to invoke a music streaming skill to play music while the user awaits the car. The user may, at a stage 408, utter: "Alexa, please stream my playlist." The system 100 may process the utterance and, at a stage 410, invoke the music streaming skill. The system 100 may make the music streaming skill the foreground skill, and move the rideshare skill to the background. The music streaming skill may process the command and output music from the user's playlist from the speakers of the device 110. In some cases, the music streaming skill and/or language output components of the system 100 may generate a confirmation message to the user. For example, the music streaming skill may cause the device 110 to output, at a stage 412, the message: "Playing Your Playlist." The music streaming skill may then cause the device 110 to play the music.

While active in the background, the rideshare skill may, at a stage 414, receive trigger data indicating that the car arranged for the user has been delayed. The rideshare skill may request that the system 100 return the rideshare skill to the foreground to allow the rideshare skill to resume the interaction with the user and request user input regarding the action being performed by the rideshare skill; for example, the previously requested ride. The system 100 may grant the request, and the rideshare skill may, at the stage 414, resume as the foreground skill. The system 100 may move music streaming skill to the background, and the music streaming skill may pause the music. The rideshare skill may cause the device to output, at a stage 416, the message: "Your car is running late. Would you like to request a new driver or cancel your ride?" The user may, at a stage 418, respond to provide the requested user input buy uttering: "Please request a new driver." The system 100 may process the utterance and provide response date to the rideshare skill. The rideshare skill may, at a stage 420, confirm the response: "I am requesting you a new driver. You have a new driver. The new ETA is seven minutes."

Figure 5:
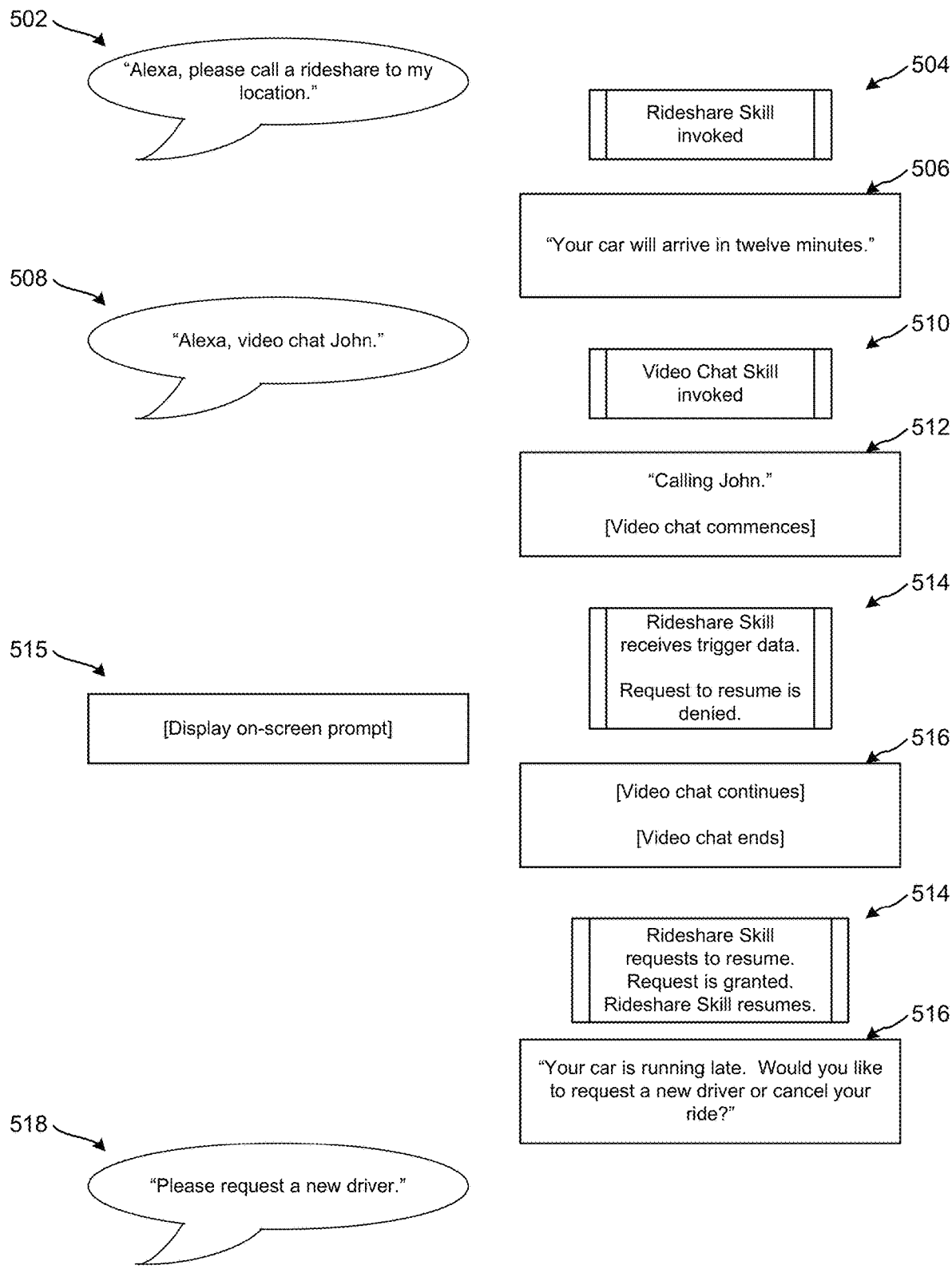
FIG. 5 illustrates second example inputs and outputs of a user interface of the speech processing system when resuming a background skill based on skill data, according to embodiments of the present disclosure.

FIG. 5 illustrates second example inputs and outputs of a user interface of the speech processing system 100 when resuming a background skill based on skill data, according to embodiments of the present disclosure. In the example shown in FIG. 4, the system 100 determined that the rideshare skill could interrupt the music streaming skill. FIG. 5 illustrates an example where the system 100 determines not to grant a request for a first skill (e.g., a rideshare skill) to resume as the foreground skill until completion of an action being performed by a second skill (e.g., a video chat skill).

At a stage 502, the user may call on Alexa to invoke a rideshare skill: "Alexa, please call a rideshare to my current location." The system 100 may process the utterance and, at a stage 504, invoke the rideshare skill and make it the foreground skill. The rideshare skill may arrange a car to pick up the user at the specified location. The system 100 may, at a stage 506, generate a confirmation message to the user: "Your car will arrive in twelve minutes."

Sometime later, the user may, at a stage 508, call on Alexa to invoke a video chat skill to call a friend while the user awaits the car: "Alexa, video chat John." The system 100 may process the utterance and, at a stage 510, invoke the video chat skill. The system 100 may make the video chat skill the foreground skill, and move the rideshare skill to the background. The video chat skill may process the command and initiate the requested communication. In some cases, the system 100 may, at a stage 512, output a confirmation: "Calling John." The video chat skill may attempt to initiate the video chat session with the specified contact While active in the background, the rideshare skill may receive trigger data indicating that the car arranged for the user has been delayed. The rideshare skill may, at a stage 514, request that the system 100 return the rideshare skill to the foreground. The system 100 may, however, determine that the video chat is in progress and is not to be interrupted. The system 100 may thus deny the request. In some implementations, the rideshare skill, upon denial of its request, may, at a stage 515, send a multi-modal notification to the user. For example, the rideshare skill may send a push notification that may appear as an on-screen prompt on the user's device, send the user a text message or email, etc. Thus, the rideshare skill may have other channels available in which to notify the user that further input is requested despite the rideshare skill's lack of access to the VUI. The video chat may, at a stage 516, continue for a time, and eventually end.

Sometime later, the rideshare skill may, at a stage 516, repeat the request to return to the foreground. Having determined that the video chat session has completed (e.g., that the second skill is no longer in the active state), the system 100 may grant the request, and the rideshare skill may, resume as the foreground skill to cause the system 100 to output, at a stage 516, the message: "Your car is running late. Would you like to request a new driver or cancel your ride?" The user may, at a stage 518, respond to provide the requested user input buy uttering: "Please request a new driver." The system 100 may process the utterance as appropriate.

Figure 6A:
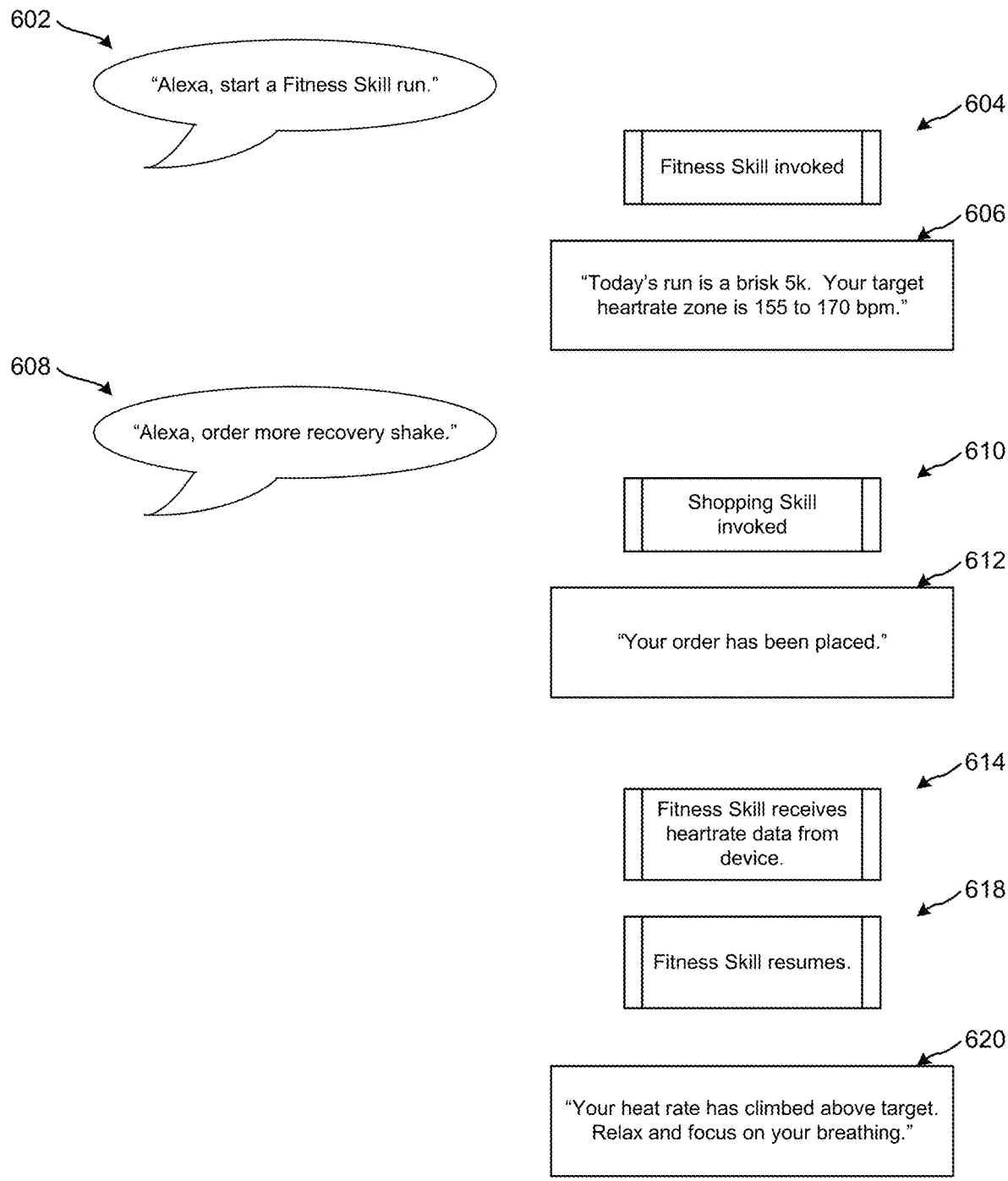
FIG. 6A illustrates example inputs and outputs of a user interface of the speech processing system when resuming a background skill based on device data, according to embodiments of the present disclosure.

FIG. 6A illustrates example inputs and outputs of a voice user interface of the speech processing system 100 when resuming a background skill based on device data, according to embodiments of the present disclosure. The user may, at a stage 602, call on Alexa to invoke a fitness skill: "Alexa, start a Fitness Skill run." The system 100 may process the utterance and, at a stage 604, invoke the fitness skill and make it the foreground skill. The fitness skill, based on data from the user's profile, identify a run appropriate for an overall fitness plan for the user. The fitness skill may, at a stage 606, cause the system 100 to output confirm the instruction and provide guidance to the user: "Today's run is a brisk 5 k. Your target heartrate zone is 155 to 170 beats per minute." Following the output, and subject to user preferences and/or system permissions, the fitness skill may change its state to background.

During the run, the user may, at a stage 608, call on Alexa to make a purchase: "Alexa, order more recovery shake." The system 100 may process the utterance and, at a stage 610, invoke a shopping skill. The system 100 may make the shopping skill the foreground skill and move the fitness skill to the background. The shopping skill may, at a stage 612, confirm the instruction: "Your order has been placed."

During the run, the user may be wearing a heartrate monitor in communication with the device 110. The user may have granted permission for the fitness skill to access user data including heartrate data whenever the fitness skill is active. Accordingly, the fitness skill may, at a stage 614, receive trigger data from the device 110, such as heartrate data. The fitness skill may determine that the user's heartrate has risen outside the target zone, and to output a message to the user. The fitness skill still be active in the background, however, due to the user's invocation of the shopping skill. The fitness skill may thus request that the system 100 return the fitness skill to the foreground to allow the fitness skill to resume the previous interaction. The system 100 may grant the request, and the fitness skill may, at a stage 618, resume as the foreground skill. The fitness skill may cause the device to output, at a stage 620, the message: "Your heartrate has climbed above target. Relax and focus on your breathing."

Figure 6B:
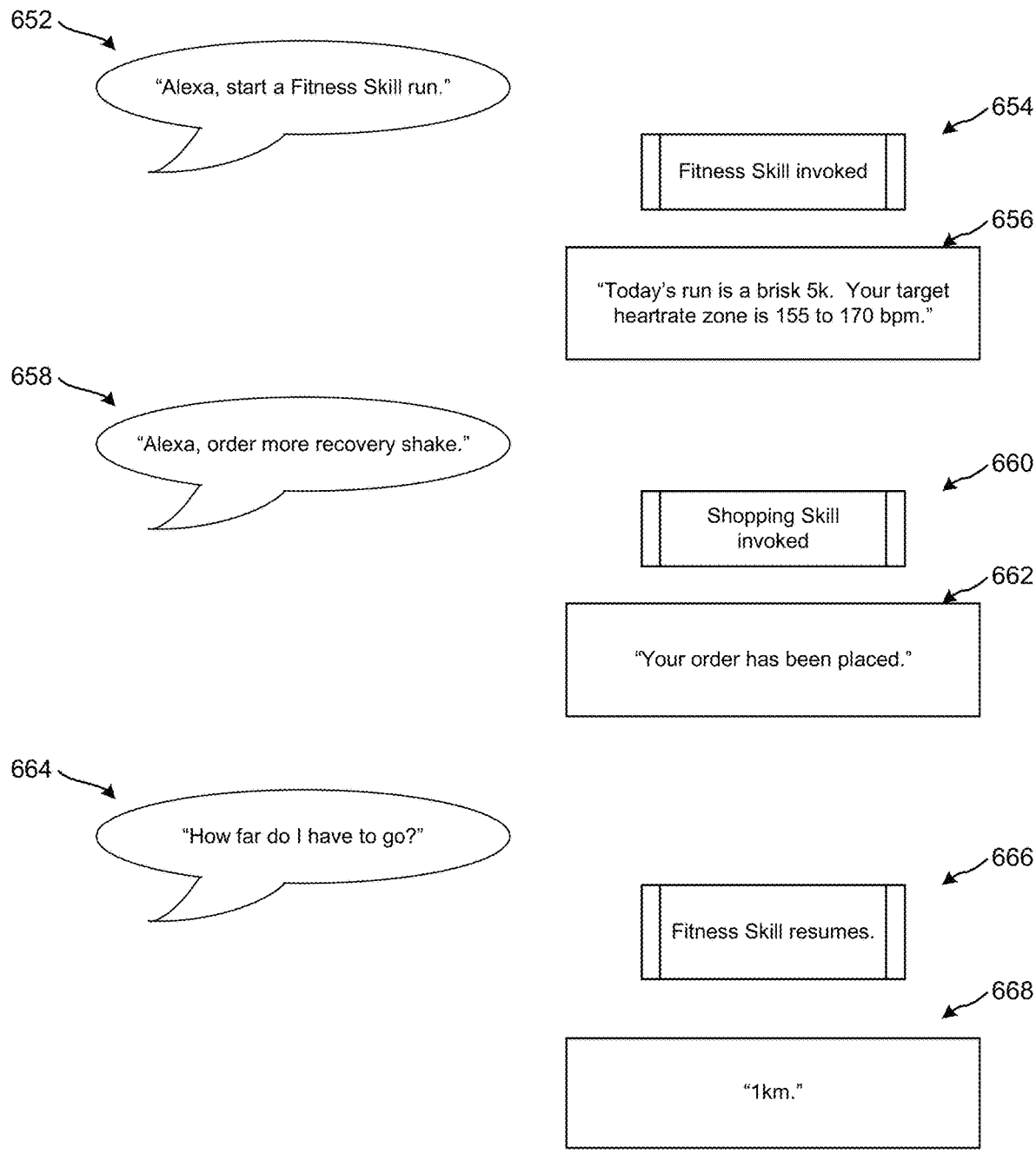
FIG. 6B illustrates example inputs and outputs of a user interface of the speech processing system when the user resumes a background skill, according to embodiments of the present disclosure.

FIG. 6B illustrates example inputs and outputs of a user interface of the speech processing system when the user resumes a background skill, according to embodiments of the present disclosure. Stages 652 through 662 may be the same as or similar to the stages 602 through 612 in FIG. 6A. At a stage 664, the system 100 may receive a natural language input from the user: "How far do I have to go?" The system 100 may, using skill state data stored by the skill manager 295, determine which skill(s) is/are active and/or backgrounded, and use the skill state data as context data for processing the natural language input. The system 100 may determine, based on the fitness skill having being in the background state, that the user input relates to the fitness skill, even in absence of explicit invocation of the skill and/or an intent associated with the fitness skill. The system 100 may thus, at a stage 666, set the fitness skill's state to active, and send data representing the user input to the skill. The fitness skill may, at a stage 668, process the data and return a response. The system 100 may convert the response to a natural language output (e.g., natural language text and/or synthesized speech), and output the response to the user: "1 km." Following the output, the system 100 may return the fitness skill to the background state to leave the VUI available for inputs to other skills and outputs from other skills that may resume as active.

Figure 7:
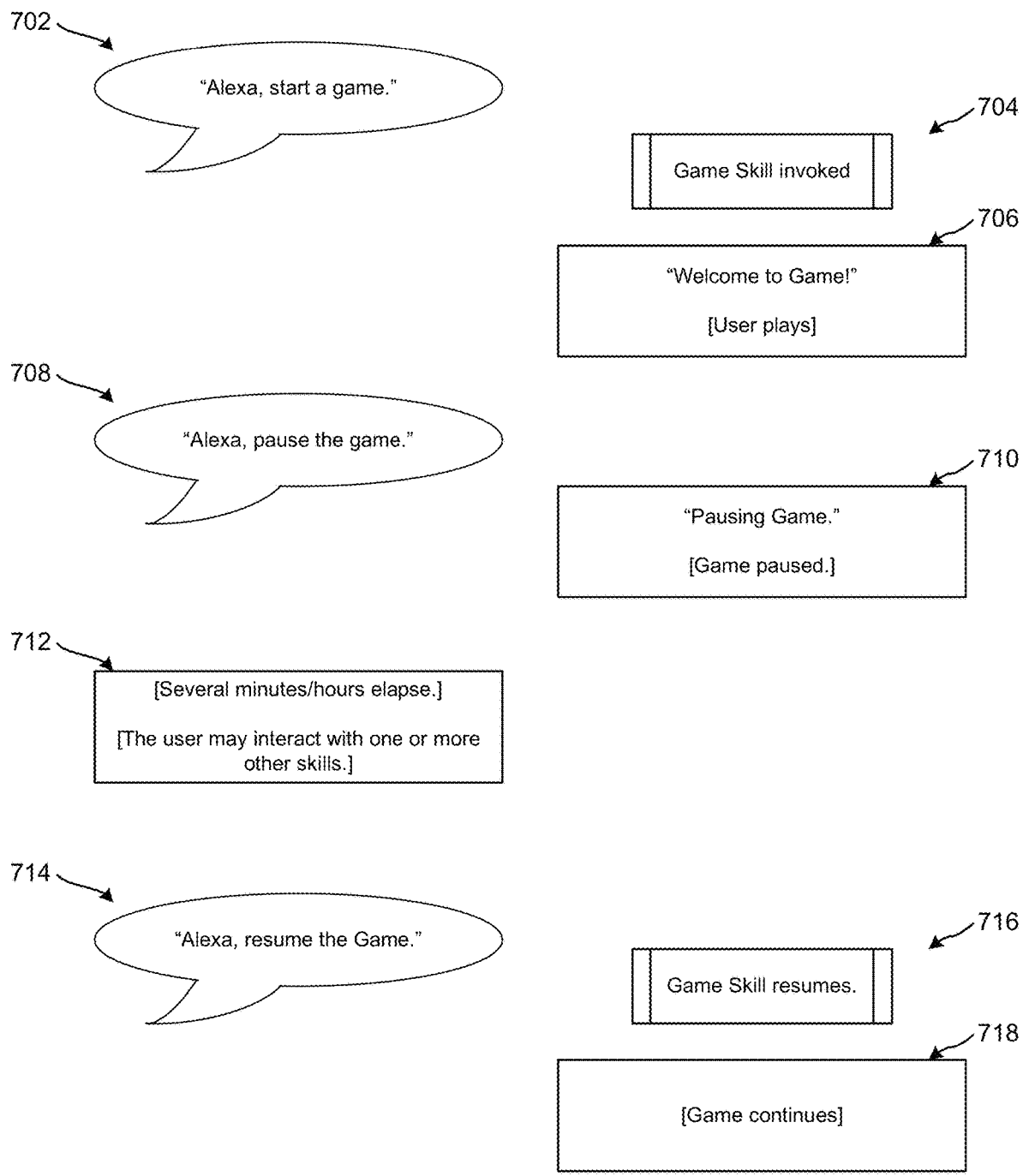
FIG. 7 illustrates example inputs and outputs of a user interface of the speech processing system when resuming a background skill previously paused by the user, according to embodiments of the present disclosure.

FIG. 7 illustrates example inputs and outputs of a user interface of the speech processing system 100 when resuming a background skill previously paused by the user, according to embodiments of the present disclosure. The user may, at a stage 702, call on Alexa to invoke a game skill: "Alexa, start a game." The system 100 may, at a stage 704, process the utterance and determine to invoke the game skill and bring it to the foreground. The podcast skill, at a stage 706, may cause the system 100 to output a confirmation message: "Welcome to Game!" The user may play the game with the game skill in the active state and receiving inputs/providing outputs via the VUI and/or other media.

The user may, at a stage 708, ask Alexa to pause: "Alexa, pause the game." The system 100 may process the utterance, and the game skill may, at a stage 710, confirm the command with a message: "Pausing Game." The system 100 may change the state of the game skill to background such that the user's game state is saved. Several minutes or hours may elapse (stage 712). During this time, the user may interact with one or more other skills via VUI interactions with the system 100. The user may, at a stage 714, call on Alexa to resume: "Alexa, resume the Game." The system 100 may process the utterance and determine that it relates to an action previously performed by a skill that is currently in the background. The system 100 may, at a stage 716, resume the game skill and return it to the foreground. The game skill may, at a stage 718, continue presenting the game experience to the user from where the user previously left off.

FIG. 8 illustrates first example inputs and outputs of a user interface of the speech processing system 100 listing active skills, according to embodiments of the present disclosure. From time to time, a user may wish to know which skills are currently active in the system 100, either in the foreground or background. The system 100 may receive and respond to such an inquiry via the VUI as illustrated in FIG. 8. The user may, at a stage 802, ask the system 100 about skill currently running (e.g., on the device 110): "Alexa, what skills are active?" The system 100 may process the utterance and, at a stage 804, provide a response: "Rideshare skill and podcast skill are currently running in the background. Would you like to close any of these skills?" The user may, at a stage 808, ask the system 100 to terminate one or more of the skills: "Please close Podcast skill." The system 100 may process the utterance and may, at a stage 810, output a confirmation message: "Closing Podcast skill," and terminate the podcast skill (e.g., change its status to "terminated").

Returning to FIG. 2, the system 100 may operate using various components as shown in FIG. 2. The various components may be located on same or different physical devices; for example, one or more device 110, one or more systems 120, and/or one or more skill support systems 225. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 220. The wakeword detection component 220 may be configured to detect various wakewords. In at least some examples, each wakeword may correspond to a name of a different digital assistant. An example wakeword/digital assistant name is "Alexa." In another example, input to the system may be in form of text data 213, for example as a result of a user typing an input into a user interface of device 110. Other input forms may include indication that the user has pressed a physical or virtual button on device 110, the user has made a gesture, etc. The device 110 may also capture images using camera(s) 1418 of the device 110 and may send image data 221 representing those image(s) to the system 120. The image data 221 may include raw image data or image data processed by the device 110 before sending to the system 120. The image data 221 may be used in various manners by different components of the system to perform operations such as determining whether a user is directing an utterance to the system, interpreting a user command, responding to a user command, etc.

The wakeword detection component 220 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 220 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMIs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 220 and/or input is detected by an input detector, the device 110 may "wake" and begin processing the audio data 211, representing the audio 11. The audio data 211 may include data corresponding to the wakeword; in other embodiments, the portion of the audio corresponding to the wakeword is removed prior to processing the audio data 211 (e.g., by language processing components 292 of the device 110 and/or the system(s) 120). In the case of touch input detection or gesture based input detection, the audio data may not include a wakeword.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detection component 220 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 290 of one or more systems 120.

Upon receipt by the device 110 and/or system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 may send the audio data 211 to a language processing components 292. The language processing components 292 (sometimes also referred to as a spoken language understanding (SLU) component) includes an automatic speech recognition (ASR) component 250 and a natural language understanding (NLU) component 260. The ASR component 250 may transcribe the audio data 211 into text data. The text data output by the ASR component 250 represents one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., acoustic units such as phonemes, senons, phones, etc.) and sequences of sounds to identify words that match the sequence of sounds of the speech represented in the audio data 211. The ASR component 250 sends the text data generated thereby to an NLU component 260, via, in some embodiments, the orchestrator component 230. The text data sent from the ASR component 250 to the NLU component 260 may include a single top-scoring ASR hypothesis or may include an N-best list including multiple top-scoring ASR hypotheses. An N-best list may additionally include a respective score associated with each ASR hypothesis represented therein. The ASR component 250 is described in greater detail below with regard to FIG. 9.

The speech processing system 292 may further include a NLU component 260. The NLU component 260 may receive the text data from the ASR component. The NLU component 260 may attempts to make a semantic interpretation of the phrase(s) or statement(s) represented in the text data input therein by determining one or more meanings associated with the phrase(s) or statement(s) represented in the text data. The NLU component 260 may determine an intent representing an action that a user desires be performed and may determine information that allows a device (e.g., the device 110, the system(s) 120, a skill component 290, a skill system(s) 225, etc.) to execute the intent. For example, if the text data corresponds to "play the $5^{th}$ Symphony by Beethoven," the NLU component 260 may determine an intent that the system output music and may identify "Beethoven" as an artist/composer and "5th Symphony" as the piece of music to be played. For further example, if the text data corresponds to "what is the weather," the NLU component 260 may determine an intent that the system output weather information associated with a geographic location of the device 110. In another example, if the text data corresponds to "turn off the lights," the NLU component 260 may determine an intent that the system turn off lights associated with the device 110 or the user 5. However, if the NLU component 260 is unable to resolve the entity—for example, because the entity is referred to by anaphora such as "this song" or "my next appointment"—the speech processing system 292 can send a decode request to another speech processing system 292 for information regarding the entity mention and/or other context related to the utterance. The speech processing system 292 may augment, correct, or base results data upon the audio data 211 as well as any data received from the other speech processing system 292.

The NLU component 260 may return NLU results data 1185/1125 (which may include tagged text data, indicators of intent, etc.) back to the orcestrator component 230. The orcestrator component 230 may forward the NLU results data to a skill component(s) 290. If the NLU results data includes a single NLU hypothesis, the NLU component 260 and the orchestrator component 230 may direct the NLU results data to the skill component(s) 290 associated with the NLU hypothesis. If the NLU results data 1185/1125 includes an N-best list of NLU hypotheses, the NLU component 260 and the orchestrator component 230 may direct the top scoring NLU hypothesis to a skill component(s) 290 associated with the top scoring NLU hypothesis. The system may also include a post-NLU ranker 1165 which may incorporate other information to rank potential interpretations determined by the NLU component 260. The local device 110 may also include its own post-NLU ranker 1165, which may operate similarly to the system 120 post-NLU ranker 1165. The NLU component 260, post-NLU ranker 1165 and other components are described in greater detail below with regard to FIGS. 10 and 11.

A skill component may be software running on the device 110 and/or system(s) 120 that is akin to a software application. That is, a skill component 290 may enable the system 100 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system 100 may be configured with more than one skill component 290. For example, a weather service skill component may enable the system 100 to provide weather information, a car service skill component may enable the system 100 to book a trip with respect to a taxi or ride sharing service, a restaurant skill component may enable the system 100 to order a pizza with respect to the restaurant's online ordering system, etc. A skill component 290 may operate in conjunction between the system 100 and other devices, such as the device 110, in order to complete certain functions. Inputs to a skill component 290 may come from speech processing interactions or through other interactions or input sources. A skill component 290 may include hardware, software, firmware, or the like that may be dedicated to a particular skill component 290 or shared among different skill components 290.

A skill support system(s) 225 may communicate with a skill component(s) 290 within the device 110 and/or system(s) 120 and/or directly with the orchestrator component 230 or with other components. A skill support system(s) 225 may be configured to perform one or more actions. An ability to perform such action(s) may sometimes be referred to as a "skill." That is, a skill may enable a skill support system(s) 225 to execute specific functionality in order to provide data or perform some other action requested by a user. For example, a weather service skill may enable a skill support system(s) 225 to provide weather information to the system 120, a car service skill may enable a skill support system(s) 225 to book a trip with respect to a taxi or ridesharing service, an order pizza skill may enable a skill support system(s) 225 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system 100 may be configured with a skill component 290 dedicated to interacting with the skill support system(s) 225. Unless expressly stated otherwise, reference to a skill, skill device, or skill component may include a skill component 290 operated by the device 110 and/or system(s) 120 and/or skill operated by the skill support system(s) 225. Moreover, the functionality described herein as a skill or skill may be referred to using many different terms, such as an action, bot, app, or the like. The skill 290 and or skill support system(s) 225 may return output data to the orcestrator component 230.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system(s) 100 may include a dialog manager component 272 that manages and/or tracks a dialog between a user and a device. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 272 may associate a dialog session identifier with the dialog upon identifying that the user is engaging in a dialog with the user. The dialog manager component 272 may track a user input and the corresponding system generated response to the user input as a turn. The dialog session identifier may correspond to multiple turns of user input and corresponding system generated response. The dialog manager component 272 may transmit data identified by the dialog session identifier directly to the orchestrator component 230 or other component. Depending on system configuration the dialog manager component 272 may determine the appropriate system generated response to give to a particular utterance or user input of a turn. Or creation of the system generated response may be managed by another component of the system (e.g., the language output components 293, NLG 279, orcestrator component 230, etc.) while the dialog manager component 272 selects the appropriate responses. Alternatively, another component of the system(s) 120 may select responses using techniques discussed herein. The text of a system generated response may be sent to a TTS component 280 for creation of audio data corresponding to the response. The audio data may then be sent to a user device (e.g., device 110) for ultimate output to the user. Alternatively (or in addition) a dialog response may be returned in text or some other form.

The dialog manager component 272 may receive the ASR hypothesis/hypotheses (i.e., text data) and make a semantic interpretation of the phrase(s) or statement(s) represented therein. That is, the dialog manager component 272 determines one or more meanings associated with the phrase(s) or statement(s) represented in the text data based on words represented in the text data. The dialog manager component 272 determines a goal corresponding to an action that a user desires be performed as well as pieces of the text data that allow a device (e.g., the device 110, the system(s) 120, a skill 290, a skill system(s) 225, etc.) to execute the intent. If, for example, the text data corresponds to "what is the weather," the dialog manager component 272 may determine that that the system 100 is to output weather information associated with a geographic location of the device 110. In another example, if the text data corresponds to "turn off the lights," the dialog manager component 272 may determine that the system 100 is to turn off lights associated with the device(s) 110 or the user(s) 5.

The dialog manager component 272 may send the results data to one or more skill(s) 290. If the results data includes a single hypothesis, the orchestrator component 230 may send the results data to the skill(s) 290 associated with the hypothesis. If the results data includes an N-best list of hypotheses, the orchestrator component 230 may send the top scoring hypothesis to a skill(s) 290 associated with the top scoring hypothesis.

The system 100 includes a language output components 293. The language output components 293 includes a natural language generation (NLG) component 279 and a text-to-speech (TTS) component 280. The NLG component 279 can generate text for purposes of TTS output to a user. For example the NLG component 279 may generate text corresponding to instructions corresponding to a particular action for the user to perform. The NLG component 279 may generate appropriate text for various outputs as described herein. The NLG component 279 may include one or more trained models configured to output text appropriate for a particular input. The text output by the NLG component 279 may become input for the TTS component 280 (e.g., output text data 1310 discussed below). Alternatively or in addition, the TTS component 280 may receive text data from a skill 290 or other system component for output.

The NLG component 279 may include a trained model. The NLG component 279 generates text data 1310 from dialog data received by the dialog manager component 272 such that the output text data 1310 has a natural feel and, in some embodiments, includes words and/or phrases specifically formatted for a requesting individual. The NLG may use templates to formulate responses. And/or the NLG system may include models trained from the various templates for forming the output text data 1310. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 280.

The TTS component 280 may generate audio data (e.g., synthesized speech) from text data using one or more different methods. Text data input to the TTS component 280 may come from a skill component 290, the orchestrator component 230, or another component of the system. In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 270 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 270 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 270 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 9:
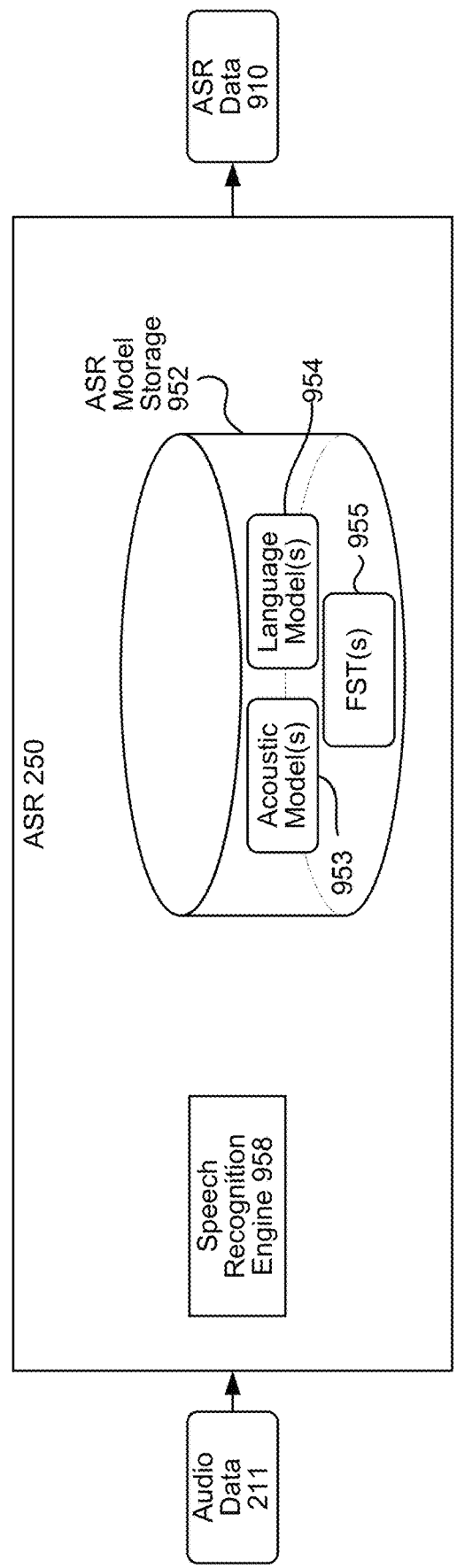
FIG. 9 is a conceptual diagram of an ASR component, according to embodiments of the present disclosure.

FIG. 9 is a conceptual diagram of an ASR component 250, according to embodiments of the present disclosure. The ASR component 250 may interpret a spoken natural language input based on the similarity between the spoken natural language input and pre-established language models 954 stored in an ASR model storage 952. For example, the ASR component 250 may compare the audio data with models for sounds (e.g., subword units or phonemes) and sequences of sounds to identify words that match the sequence of sounds spoken in the natural language input. Alternatively, the ASR component 250 may use a finite state transducer (FST) 955 to implement the language model functions.

When the ASR component 250 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 953 stored in the ASR model storage 952), and the likelihood that a particular word, which matches the sounds, would be included in the sentence at the specific location (e.g., using a language or grammar model 954). Based on the considered factors and the assigned confidence score, the ASR component 250 may output an ASR hypothesis that most likely matches the spoken natural language input, or may output multiple ASR hypotheses in the form of a lattice or an N-best list, with each ASR hypothesis corresponding to a respective score.

The ASR component 250 may include a speech recognition engine 958. The ASR component 250 receives audio data 211 (for example, received from a local device 110 having processed audio detected by a microphone by an acoustic front end (AFE) or other component). The speech recognition engine 958 compares the audio data 211 with acoustic models 953, language models 954, FST(s) 955, and/or other data models and information for recognizing the speech conveyed in the audio data. The audio data 211 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 958 may process the audio data 211 with reference to information stored in the ASR model storage 952. Feature vectors of the audio data 211 may arrive at the system 120 encoded, in which case they may be decoded prior to processing by the speech recognition engine 958.

The speech recognition engine 958 attempts to match received feature vectors to language acoustic units (e.g., phonemes) and words as known in the stored acoustic models 953, language models 2B54, and FST(s) 955. For example, audio data 211 may be processed by one or more acoustic model(s) 953 to determine acoustic unit data. The acoustic unit data may include indicators of acoustic units detected in the audio data 211 by the ASR component 250. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 954 (and/or using FST 955) to determine ASR data 910. The ASR data 910 can include one or more hypotheses. One or more of the hypotheses represented in the ASR data 910 may then be sent to further components (such as the NLU component 260) for further processing as discussed herein. The ASR data 910 may include representations of text of an utterance, such as words, subword units, or the like.

The speech recognition engine 958 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 250 will output ASR hypotheses that make sense grammatically. The specific models used may be general models or may be models corresponding to a particular domain, such as music, banking, etc.

The speech recognition engine 958 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 958 may use the acoustic model(s) 953 to attempt to match received audio feature vectors to words or subword acoustic units. An acoustic unit may be a senone, phoneme, phoneme in context, syllable, part of a syllable, syllable in context, or any other such portion of a word. The speech recognition engine 958 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 250 outputs ASR hypotheses that make sense grammatically.

The speech recognition engine 958 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 958, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 958 may also compute scores of branches of the paths based on language models or grammars. Language modeling involves determining scores for what words are likely to be used together to form coherent words and sentences. Application of a language model may improve the likelihood that the ASR component 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 10:
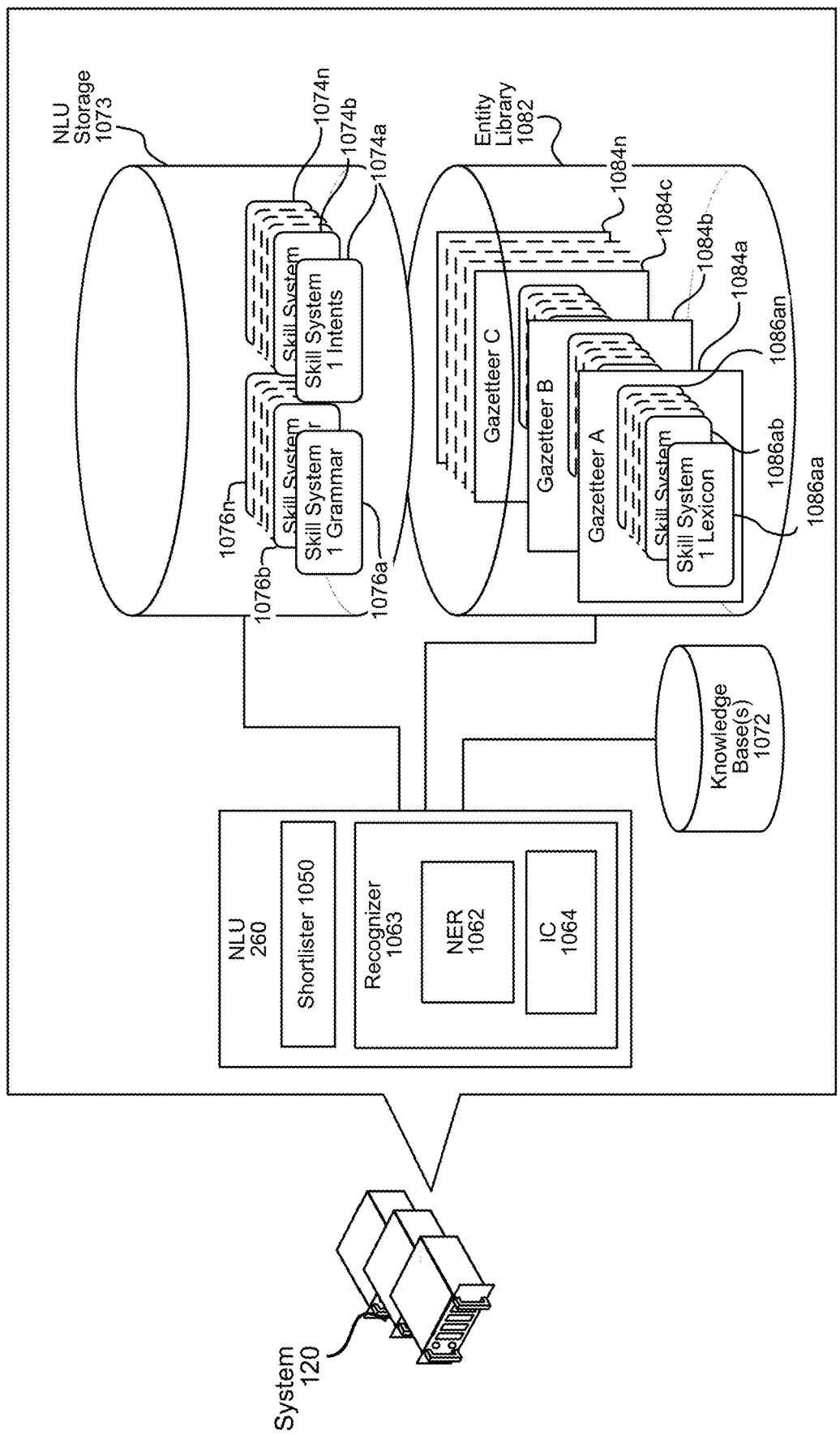
FIG. 10 is a conceptual diagram of how natural language processing is performed, according to embodiments of the present disclosure.
Figure 11:
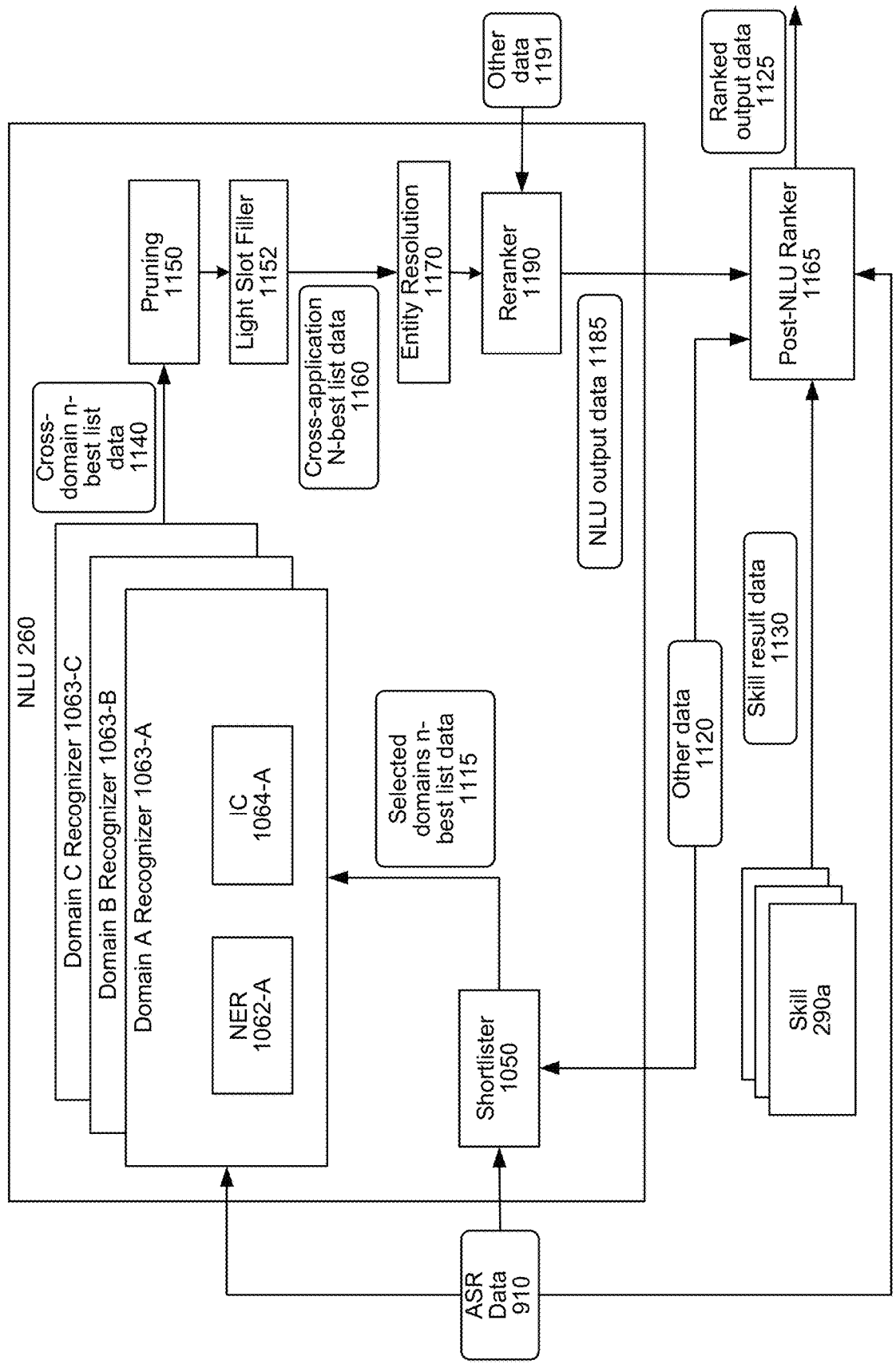
FIG. 11 is a conceptual diagram of how natural language processing is performed, according to embodiments of the present disclosure.

FIGS. 10 and 11 illustrates how the NLU component 260 may perform NLU processing. FIG. 10 is a conceptual diagram of how natural language processing is performed, according to embodiments of the present disclosure. And FIG. 11 is a conceptual diagram of how natural language processing is performed, according to embodiments of the present disclosure.

FIG. 10 illustrates how NLU processing is performed on text data. The NLU component 260 may process text data including several ASR hypotheses of a single user input. For example, if the ASR component 250 outputs text data including an n-best list of ASR hypotheses, the NLU component 260 may process the text data with respect to all (or a portion of) the ASR hypotheses represented therein.

The NLU component 260 may annotate text data by parsing and/or tagging the text data. For example, for the text data "tell me the weather for Seattle," the NLU component 260 may tag "tell me the weather for Seattle" as an <OutputWeather> intent as well as separately tag "Seattle" as a location for the weather information.

The NLU component 260 may include a shortlister component 1050. The shortlister component 1050 selects skills that may execute with respect to ASR output data 910 input to the NLU component 260 (e.g., applications that may execute with respect to the user input). The ASR output data 910 (which may also be referred to as ASR data 910) may include representations of text of an utterance, such as words, subword units, or the like. The shortlister component 1050 thus limits downstream, more resource intensive NLU processes to being performed with respect to skills that may execute with respect to the user input.

Without a shortlister component 1050, the NLU component 260 may process ASR output data 910 input thereto with respect to every skill of the system, either in parallel, in series, or using some combination thereof. By implementing a shortlister component 1050, the NLU component 260 may process ASR output data 910 with respect to only the skills that may execute with respect to the user input. This reduces total compute power and latency attributed to NLU processing.

The shortlister component 1050 may include one or more trained models. The model(s) may be trained to recognize various forms of user inputs that may be received by the system(s) 120. For example, during a training period skill system(s) 225 associated with a skill may provide the system(s) 120 with training text data representing sample user inputs that may be provided by a user to invoke the skill. For example, for a ride sharing skill, a skill system(s) 225 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 1050 may be trained, using the training text data representing sample user inputs, to determine other potentially related user input structures that users may try to use to invoke the particular skill. During training, the system(s) 120 may solicit the skill system(s) 225 associated with the skill regarding whether the determined other user input structures are permissible, from the perspective of the skill system(s) 225, to be used to invoke the skill. The alternate user input structures may be derived by one or more trained models during model training and/or may be based on user input structures provided by different skills. The skill system(s) 225 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 1050 may be trained with respect to a different skill. Alternatively, the shortlister component 1050 may use one trained model per domain, such as one trained model for skills associated with a weather domain, one trained model for skills associated with a ride sharing domain, etc.

The system(s) 120 may use the sample user inputs provided by a skill system(s) 225, and related sample user inputs potentially determined during training, as binary examples to train a model associated with a skill associated with the skill system(s) 225. The model associated with the particular skill may then be operated at runtime by the shortlister component 1050. For example, some sample user inputs may be positive examples (e.g., user inputs that may be used to invoke the skill). Other sample user inputs may be negative examples (e.g., user inputs that may not be used to invoke the skill).

As described above, the shortlister component 1050 may include a different trained model for each skill of the system, a different trained model for each domain, or some other combination of trained model(s). For example, the shortlister component 1050 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 1050 to output indications of only a portion of the skills that the ASR output data 910 may relate to. For example, a user input may correspond to "tell me about Tom Collins." If the model is clustered based on domain, the shortlister component 1050 may determine the user input corresponds to a recipe skill (e.g., a drink recipe) even though the user input may also correspond to an information skill (e.g., including information about a person named Tom Collins).

The NLU component 260 may include one or more recognizers 1063. In at least some embodiments, a recognizer 1063 may be associated with a skill system 225 (e.g., the recognizer may be configured to interpret text data to correspond to the skill system 225). In at least some other examples, a recognizer 1063 may be associated with a domain such as smart home, video, music, weather, custom, etc. (e.g., the recognizer may be configured to interpret text data to correspond to the domain).

If the shortlister component 1050 determines ASR output data 910 is potentially associated with multiple domains, the recognizers 1063 associated with the domains may process the ASR output data 910, while recognizers 1063 not indicated in the shortlister component 1050's output may not process the ASR output data 910. The "shortlisted" recognizers 1063 may process the ASR output data 910 in parallel, in series, partially in parallel, etc. For example, if ASR output data 910 potentially relates to both a communications domain and a music domain, a recognizer associated with the communications domain may process the ASR output data 910 in parallel, or partially in parallel, with a recognizer associated with the music domain processing the ASR output data 910.

Each recognizer 1063 may include a named entity recognition (NER) component 1062. The NER component 1062 attempts to identify grammars and lexical information that may be used to construe meaning with respect to text data input therein. The NER component 1062 identifies portions of text data that correspond to a named entity associated with a domain, associated with the recognizer 1063 implementing the NER component 1062. The NER component 1062 (or other component of the NLU component 260) may also determine whether a word refers to an entity whose identity is not explicitly mentioned in the text data, for example "him," "her," "it" or other anaphora, exophora, or the like.

Each recognizer 1063, and more specifically each NER component 1062, may be associated with a particular grammar database 1076, a particular set of intents/actions 1074, and a particular personalized lexicon 1086. The grammar databases 1076, and intents/actions 1074 may be stored in an NLU storage 1073. Each gazetteer 1084 may include domain/skill-indexed lexical information associated with a particular user and/or device 110. For example, a Gazetteer A (1084a) includes skill-indexed lexical information 1086aa to 1086an. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 1062 applies grammar information 1076 and lexical information 1086 associated with a domain (associated with the recognizer 1063 implementing the NER component 1062) to determine a mention of one or more entities in text data. In this manner, the NER component 1062 identifies "slots" (each corresponding to one or more particular words in text data) that may be useful for later processing. The NER component 1062 may also label each slot with a type (e.g., noun, place, city, artist name, song name, etc.).

Each grammar database 1076 includes the names of entities (i.e., nouns) commonly found in speech about the particular domain to which the grammar database 1076 relates, whereas the lexical information 1086 is personalized to the user and/or the device 110 from which the user input originated. For example, a grammar database 1076 associated with a shopping domain may include a database of words commonly used when people discuss shopping.

A downstream process called entity resolution (discussed in detail elsewhere herein) links a slot of text data to a specific entity known to the system. To perform entity resolution, the NLU component 260 may utilize gazetteer information (1084a-1084n) stored in an entity library storage 1082. The gazetteer information 1084 may be used to match text data (representing a portion of the user input) with text data representing known entities, such as song titles, contact names, etc. Gazetteers 1084 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 1063 may also include an intent classification (IC) component 1064. An IC component 1064 parses text data to determine an intent(s) (associated with the domain associated with the recognizer 1063 implementing the IC component 1064) that potentially represents the user input. An intent represents to an action a user desires be performed. An IC component 1064 may communicate with a database 1074 of words linked to intents. For example, a music intent database may link words and phrases such as "quiet," "volume off," and "mute" to a <Mute> intent. An IC component 1064 identifies potential intents by comparing words and phrases in text data (representing at least a portion of the user input) to the words and phrases in an intents database 1074 (associated with the domain that is associated with the recognizer 1063 implementing the IC component 1064).

The intents identifiable by a specific IC component 1064 are linked to domain-specific (i.e., the domain associated with the recognizer 1063 implementing the IC component 1064) grammar frameworks 1076 with "slots" to be filled. Each slot of a grammar framework 1076 corresponds to a portion of text data that the system believes corresponds to an entity. For example, a grammar framework 1076 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 1076 may not be structured as sentences, but rather based on associating slots with grammatical tags.

For example, an NER component 1062 may parse text data to identify words as subject, object, verb, preposition, etc. based on grammar rules and/or models prior to recognizing named entities in the text data. An IC component 1064 (implemented by the same recognizer 1063 as the NER component 1062) may use the identified verb to identify an intent. The NER component 1062 may then determine a grammar model 1076 associated with the identified intent. For example, a grammar model 1076 for an intent corresponding to <PlayMusic> may specify a list of slots applicable to play the identified "object" and any object modifier (e.g., a prepositional phrase), such as {Artist Name}, {Album Name}, {Song name}, etc. The NER component 1062 may then search corresponding fields in a lexicon 1086 (associated with the domain associated with the recognizer 1063 implementing the NER component 1062), attempting to match words and phrases in text data the NER component 1062 previously tagged as a grammatical object or object modifier with those identified in the lexicon 1086.

An NER component 1062 may perform semantic tagging, which is the labeling of a word or combination of words according to their type/semantic meaning. An NER component 1062 may parse text data using heuristic grammar rules, or a model may be constructed using techniques such as Hidden Markov Models, maximum entropy models, log linear models, conditional random fields (CRF), and the like. For example, an NER component 1062 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 1062 identifies "Play" as a verb based on a word database associated with the music domain, which an IC component 1064 (also implemented by the music domain recognizer) may determine corresponds to a <PlayMusic> intent. At this stage, no determination has been made as to the meaning of "mother's little helper" or "the rolling stones," but based on grammar rules and models, the NER component 1062 has determined the text of these phrases relates to the grammatical object (i.e., entity) of the user input represented in the text data.

An NER component 1062 may tag text data to attribute meaning thereto. For example, an NER component 1062 may tag "play mother's little helper by the rolling stones" as: {domain} Music, {intent}<PlayMusic>, {artist name} rolling stones, {media type} SONG, and {song title} mother's little helper. For further example, the NER component 1062 may tag "play songs by the rolling stones" as: {domain} Music, {intent}<PlayMusic>, {artist name} rolling stones, and {media type} SONG.

The shortlister component 1050 may receive ASR output data 910 output from the ASR component 250 or output from the device 110b (as illustrated in FIG. 11). The ASR component 250 may embed the ASR output data 910 into a form processable by a trained model(s) using sentence embedding techniques as known in the art. Sentence embedding results in the ASR output data 910 including text in a structure that enables the trained models of the shortlister component 1050 to operate on the ASR output data 910. For example, an embedding of the ASR output data 910 may be a vector representation of the ASR output data 910.

The shortlister component 1050 may make binary determinations (e.g., yes or no) regarding which domains relate to the ASR output data 910. The shortlister component 1050 may make such determinations using the one or more trained models described herein above. If the shortlister component 1050 implements a single trained model for each domain, the shortlister component 1050 may simply run the models that are associated with enabled domains as indicated in a user profile associated with the device 110 and/or user that originated the user input.

The shortlister component 1050 may generate n-best list data 1115 representing domains that may execute with respect to the user input represented in the ASR output data 910. The size of the n-best list represented in the n-best list data 1115 is configurable. In an example, the n-best list data 1115 may indicate every domain of the system as well as contain an indication, for each domain, regarding whether the domain is likely capable to execute the user input represented in the ASR output data 910. In another example, instead of indicating every domain of the system, the n-best list data 1115 may only indicate the domains that are likely to be able to execute the user input represented in the ASR output data 910. In yet another example, the shortlister component 1050 may implement thresholding such that the n-best list data 1115 may indicate no more than a maximum number of domains that may execute the user input represented in the ASR output data 910. In an example, the threshold number of domains that may be represented in the n-best list data 1115 is ten. In another example, the domains included in the n-best list data 1115 may be limited by a threshold a score, where only domains indicating a likelihood to handle the user input is above a certain score (as determined by processing the ASR output data 910 by the shortlister component 1050 relative to such domains) are included in the n-best list data 1115.

The ASR output data 910 may correspond to more than one ASR hypothesis. When this occurs, the shortlister component 1050 may output a different n-best list (represented in the n-best list data 1115) for each ASR hypothesis. Alternatively, the shortlister component 1050 may output a single n-best list representing the domains that are related to the multiple ASR hypotheses represented in the ASR output data 910.

As indicated above, the shortlister component 1050 may implement thresholding such that an n-best list output therefrom may include no more than a threshold number of entries. If the ASR output data 910 includes more than one ASR hypothesis, the n-best list output by the shortlister component 1050 may include no more than a threshold number of entries irrespective of the number of ASR hypotheses output by the ASR component 250. Alternatively or in addition, the n-best list output by the shortlister component 1050 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 910, the shortlister component 1050 may generate confidence scores representing likelihoods that domains relate to the ASR output data 910. If the shortlister component 1050 implements a different trained model for each domain, the shortlister component 1050 may generate a different confidence score for each individual domain trained model that is run. If the shortlister component 1050 runs the models of every domain when ASR output data 910 is received, the shortlister component 1050 may generate a different confidence score for each domain of the system. If the shortlister component 1050 runs the models of only the domains that are associated with skills indicated as enabled in a user profile associated with the device 110 and/or user that originated the user input, the shortlister component 1050 may only generate a different confidence score for each domain associated with at least one enabled skill. If the shortlister component 1050 implements a single trained model with domain specifically trained portions, the shortlister component 1050 may generate a different confidence score for each domain who's specifically trained portion is run. The shortlister component 1050 may perform matrix vector modification to obtain confidence scores for all domains of the system in a single instance of processing of the ASR output data 910.

N-best list data 1115 including confidence scores that may be output by the shortlister component 1050 may be represented as, for example:

Search domain, 0.67
Recipe domain, 0.62
Information domain, 0.57
Shopping domain, 0.42

As indicated, the confidence scores output by the shortlister component 1050 may be numeric values. The confidence scores output by the shortlister component 1050 may alternatively be binned values (e.g., high, medium, low).

The n-best list may only include entries for domains having a confidence score satisfying (e.g., equaling or exceeding) a minimum threshold confidence score. Alternatively, the shortlister component 1050 may include entries for all domains associated with user enabled skills, even if one or more of the domains are associated with confidence scores that do not satisfy the minimum threshold confidence score.

The shortlister component 1050 may consider other data 1120 when determining which domains may relate to the user input represented in the ASR output data 910 as well as respective confidence scores. The other data 1120 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 1120 may include an indicator of the user associated with the ASR output data 910, for example as determined by a user recognition component. In some implementations, the other data 1120 may include state information for various skills; for example, which skill(s) is active and/or which skills are backgrounded, suspended, etc. The shortlister component 1050 may favor one or more domains corresponding to an active or background skill relative to, for example, a suspended or terminated skill.

The other data 1120 may be character embedded prior to being input to the shortlister component 1050. The other data 1120 may alternatively be embedded using other techniques known in the art prior to being input to the shortlister component 1050.

The other data 1120 may also include data indicating the domains associated with skills that are enabled with respect to the device 110 and/or user that originated the user input. The shortlister component 1050 may use such data to determine which domain-specific trained models to run. That is, the shortlister component 1050 may determine to only run the trained models associated with domains that are associated with user-enabled skills. The shortlister component 1050 may alternatively use such data to alter confidence scores of domains.

As an example, considering two domains, a first domain associated with at least one enabled skill and a second domain not associated with any user-enabled skills of the user that originated the user input, the shortlister component 1050 may run a first model specific to the first domain as well as a second model specific to the second domain. Alternatively, the shortlister component 1050 may run a model configured to determine a score for each of the first and second domains. The shortlister component 1050 may determine a same confidence score for each of the first and second domains in the first instance. The shortlister component 1050 may then alter those confidence scores based on which domains is associated with at least one skill enabled by the present user. For example, the shortlister component 1050 may increase the confidence score associated with the domain associated with at least one enabled skill while leaving the confidence score associated with the other domain the same. Alternatively, the shortlister component 1050 may leave the confidence score associated with the domain associated with at least one enabled skill the same while decreasing the confidence score associated with the other domain. Moreover, the shortlister component 1050 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 270. When the shortlister component 1050 receives the ASR output data 910, the shortlister component 1050 may determine whether profile data associated with the user and/or device 110 that originated the command includes an indication of enabled skills.

The other data 1120 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 1050 may use such data to determine which domain-specific trained models to run. For example, if the device 110 corresponds to a displayless type device, the shortlister component 1050 may determine not to run trained models specific to domains that output video data. The shortlister component 1050 may alternatively use such data to alter confidence scores of domains.

As an example, considering two domains, one that outputs audio data and another that outputs video data, the shortlister component 1050 may run a first model specific to the domain that generates audio data as well as a second model specific to the domain that generates video data. Alternatively the shortlister component 1050 may run a model configured to determine a score for each domain. The shortlister component 1050 may determine a same confidence score for each of the domains in the first instance. The shortlister component 1050 may then alter the original confidence scores based on the type of the device 110 that originated the user input corresponding to the ASR output data 910. For example, if the device 110 is a displayless device, the shortlister component 1050 may increase the confidence score associated with the domain that generates audio data while leaving the confidence score associated with the domain that generates video data the same. Alternatively, if the device 110 is a displayless device, the shortlister component 1050 may leave the confidence score associated with the domain that generates audio data the same while decreasing the confidence score associated with the domain that generates video data. Moreover, if the device 110 is a displayless device, the shortlister component 1050 may increase the confidence score associated with the domain that generates audio data as well as decrease the confidence score associated with the domain that generates video data.

The type of device information represented in the other data 1120 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 1120 may represent the smart TV of other display device, and not the displayless device that captured the spoken user input.

The other data 1120 may also include data indicating the user input originating device's speed, location, or other mobility information. For example, the device may correspond to a vehicle including a display. If the vehicle is moving, the shortlister component 1050 may decrease the confidence score associated with a domain that generates video data as it may be undesirable to output video content to a user while the user is driving. The device may output data to the system(s) 120 indicating when the device is moving.

The other data 1120 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 1050 may use such data to alter confidence scores of domains. For example, the shortlister component 1050 may run a first model specific to a first domain as well as a second model specific to a second domain. Alternatively, the shortlister component 1050 may run a model configured to determine a score for each domain. The shortlister component 1050 may also determine a same confidence score for each of the domains in the first instance. The shortlister component 1050 may then alter the original confidence scores based on the first domain being invoked to cause the system to output content while the current user input was received. Based on the first domain being invoked, the shortlister component 1050 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 1115 generated by the shortlister component 1050 as well as the different types of other data 1120 considered by the shortlister component 1050 are configurable. For example, the shortlister component 1050 may update confidence scores as more other data 1120 is considered. For further example, the n-best list data 1115 may exclude relevant domains if thresholding is implemented. Thus, for example, the shortlister component 1050 may include an indication of a domain in the n-best list 1115 unless the shortlister component 1050 is one hundred percent confident that the domain may not execute the user input represented in the ASR output data 910 (e.g., the shortlister component 1050 determines a confidence score of zero for the domain).

The shortlister component 1050 may send the ASR output data 910 to recognizers 1063 associated with domains represented in the n-best list data 1115. Alternatively, the shortlister component 1050 may send the n-best list data 1115 or some other indicator of the selected subset of domains to another component (such as the orchestrator component 230) which may in turn send the ASR output data 910 to the recognizers 1063 corresponding to the domains included in the n-best list data 1115 or otherwise indicated in the indicator. If the shortlister component 1050 generates an n-best list representing domains without any associated confidence scores, the shortlister component 1050/orchestrator component 230 may send the ASR output data 910 to recognizers 1063 associated with domains that the shortlister component 1050 determines may execute the user input. If the shortlister component 1050 generates an n-best list representing domains with associated confidence scores, the shortlister component 1050/orchestrator component 230 may send the ASR output data 910 to recognizers 1063 associated with domains associated with confidence scores satisfying (e.g., meeting or exceeding) a threshold minimum confidence score.

A recognizer 1063 may output tagged text data generated by an NER component 1062 and an IC component 1064, as described herein above. The NLU component 260 may compile the output tagged text data of the recognizers 1063 into a single cross-domain n-best list 1140 and may send the cross-domain n-best list 1140 to a pruning component 1150. Each entry of tagged text (e.g., each NLU hypothesis) represented in the cross-domain n-best list data 1140 may be associated with a respective score indicating a likelihood that the NLU hypothesis corresponds to the domain associated with the recognizer 1063 from which the NLU hypothesis was output. For example, the cross-domain n-best list data 1140 may be represented as (with each line corresponding to a different NLU hypothesis):

[0.95] Intent: <PlayMusic> ArtistName: Beethoven SongName: Waldstein Sonata

[0.70] Intent: <PlayVideo> ArtistName: Beethoven VideoName: Waldstein Sonata

[0.01] Intent: <PlayMusic> ArtistName: Beethoven AlbumName: Waldstein Sonata

[0.01] Intent: <PlayMusic> SongName: Waldstein Sonata

The pruning component 1150 may sort the NLU hypotheses represented in the cross-domain n-best list data 1140 according to their respective scores. The pruning component 1150 may perform score thresholding with respect to the cross-domain NLU hypotheses. For example, the pruning component 1150 may select NLU hypotheses associated with scores satisfying (e.g., meeting and/or exceeding) a threshold score. The pruning component 1150 may also or alternatively perform number of NLU hypothesis thresholding. For example, the pruning component 1150 may select the top scoring NLU hypothesis(es). The pruning component 1150 may output a portion of the NLU hypotheses input thereto. The purpose of the pruning component 1150 is to create a reduced list of NLU hypotheses so that downstream, more resource intensive, processes may only operate on the NLU hypotheses that most likely represent the user's intent.

The NLU component 260 may include a light slot filler component 1152. The light slot filler component 1152 can take text from slots represented in the NLU hypotheses output by the pruning component 1150 and alter them to make the text more easily processed by downstream components. The light slot filler component 1152 may perform low latency operations that do not involve heavy operations such as reference to a knowledge base (e.g., 1072. The purpose of the light slot filler component 1152 is to replace words with other words or values that may be more easily understood by downstream components. For example, if a NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-domain n-best list data 1160.

The cross-domain n-best list data 1160 may be input to an entity resolution component 1170. The entity resolution component 1170 can apply rules or other instructions to standardize labels or tokens from previous stages into an intent/slot representation. The precise transformation may depend on the domain. For example, for a travel domain, the entity resolution component 1170 may transform text corresponding to "Boston airport" to the standard BOS three-letter code referring to the airport. The entity resolution component 1170 can refer to a knowledge base (e.g., 1072) that is used to specifically identify the precise entity referred to in each slot of each NLU hypothesis represented in the cross-domain n-best list data 1160. Specific intent/slot combinations may also be tied to a particular source, which may then be used to resolve the text. In the example "play songs by the stones," the entity resolution component 1170 may reference a personal music catalog, Amazon Music account, a user profile, or the like. The entity resolution component 1170 may output an altered n-best list that is based on the cross-domain n-best list 1160 but that includes more detailed information (e.g., entity IDs) about the specific entities mentioned in the slots and/or more detailed slot data that can eventually be used by a skill. The NLU component 260 may include multiple entity resolution components 1170 and each entity resolution component 1170 may be specific to one or more domains.

The NLU component 260 may include a reranker 1190. The reranker 1190 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 1170.

The reranker 1190 may apply re-scoring, biasing, or other techniques. The reranker 1190 may consider not only the data output by the entity resolution component 1170, but may also consider other data 1191. The other data 1191 may include a variety of information. For example, the other data 1191 may include skill rating or popularity data such that, if one skill has a high rating, the reranker 1190 may increase the score of a NLU hypothesis that may be processed by the skill. The other data 1191 may include state information for various skills; for example, which skill(s) is active and/or which skills are backgrounded, suspended, etc. The reranker 1190 may increase a rank and/or score of an NLU hypothesis corresponding to an active or background skill relative to, for example, a suspended or terminated skill. The other data 1191 may also include information about skills that have been enabled by the user that originated the user input. For example, the reranker 1190 may assign higher scores to NLU hypothesis that may be processed by enabled skills than NLU hypothesis that may be processed by non-enabled skills. The other data 1191 may also include data indicating user usage history, such as if the user that originated the user input regularly uses a particular skill or does so at particular times of day. The other data 1191 may additionally include data indicating date, time, location, weather, type of device 110, user identifier, context, as well as other information. For example, the reranker 1190 may consider when any particular skill is currently active (e.g., music being played, a game being played, etc.).

As illustrated and described, the entity resolution component 1170 is implemented prior to the reranker 1190. The entity resolution component 1170 may alternatively be implemented after the reranker 1190. Implementing the entity resolution component 1170 after the reranker 1190 limits the NLU hypotheses processed by the entity resolution component 1170 to only those hypotheses that successfully pass through the reranker 1190.

The reranker 1190 may be a global reranker (e.g., one that is not specific to any particular domain). Alternatively, the NLU component 260 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 260 may perform NLU processing described above with respect to domains associated with skills wholly implemented as part of the system(s) 120 (e.g., designated 290 in FIG. 2). The NLU component 260 may separately perform NLU processing described above with respect to domains associated with skills that are at least partially implemented as part of the skill system(s) 225. In an example, the shortlister component 1050 may only process with respect to these latter domains. Results of these two NLU processing paths may be merged into NLU output data 1185, which may be sent to a post-NLU ranker 1165, which may be implemented by the system(s) 120.

The post-NLU ranker 1165 may include a statistical component that produces a ranked list of intent/skill pairs with associated confidence scores. Each confidence score may indicate an adequacy of the skill's execution of the intent with respect to NLU results data associated with the skill. The post-NLU ranker 1165 may operate one or more trained models configured to process the NLU results data 1185, skill result data 1130, and the other data 1120 in order to output ranked output data 1125. The other data 1120 may include state information for various skills; for example, which skill(s) is active and/or which skills are backgrounded, suspended, etc. The post-NLU ranker 1165 may increase a rank and/or score of an NLU hypothesis corresponding to an active or background skill relative to, for example, a suspended or terminated skill. The ranked output data 1125 may include an n-best list where the NLU hypotheses in the NLU results data 1185 are reordered such that the n-best list in the ranked output data 1125 represents a prioritized list of skills to respond to a user input as determined by the post-NLU ranker 1165. The ranked output data 1125 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 1165 enables the system to better determine the best skill to execute the user input. For example, first and second NLU hypotheses in the NLU results data 1185 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 1165 (or other scheduling component such as orchestrator component 230) may solicit the first skill and the second skill to provide potential result data 1130 based on the first NLU hypothesis and the second NLU hypothesis, respectively. For example, the post-NLU ranker 1165 may send the first NLU hypothesis to the first skill 290a along with a request for the first skill 290a to at least partially execute with respect to the first NLU hypothesis. The post-NLU ranker 1165 may also send the second NLU hypothesis to the second skill 290b along with a request for the second skill 290b to at least partially execute with respect to the second NLU hypothesis. The post-NLU ranker 1165 receives, from the first skill 290a, first result data 1130a generated from the first skill 290a's execution with respect to the first NLU hypothesis. The post-NLU ranker 1165 also receives, from the second skill 290b, second results data 1130b generated from the second skill 290b's execution with respect to the second NLU hypothesis.

The result data 1130 may include various portions. For example, the result data 1130 may include content (e.g., audio data, text data, and/or video data) to be output to a user. The result data 1130 may also include a unique identifier used by the system(s) 120 and/or the skill system(s) 225 to locate the data to be output to a user. The result data 1130 may also include an instruction. For example, if the user input corresponds to "turn on the light," the result data 1130 may include an instruction causing the system to turn on a light associated with a profile of the device (110a/110b) and/or user.

The post-NLU ranker 1165 may consider the first result data 1130a and the second result data 1130b to alter the first confidence score and the second confidence score of the first NLU hypothesis and the second NLU hypothesis, respectively. That is, the post-NLU ranker 1165 may generate a third confidence score based on the first result data 1130a and the first confidence score. The third confidence score may correspond to how likely the post-NLU ranker 1165 determines the first skill will correctly respond to the user input. The post-NLU ranker 1165 may also generate a fourth confidence score based on the second result data 1130b and the second confidence score. One skilled in the art will appreciate that a first difference between the third confidence score and the fourth confidence score may be greater than a second difference between the first confidence score and the second confidence score. The post-NLU ranker 1165 may also consider the other data 1120 to generate the third confidence score and the fourth confidence score. While it has been described that the post-NLU ranker 1165 may alter the confidence scores associated with first and second NLU hypotheses, one skilled in the art will appreciate that the post-NLU ranker 1165 may alter the confidence scores of more than two NLU hypotheses. The post-NLU ranker 1165 may select the result data 1130 associated with the skill 290 with the highest altered confidence score to be the data output in response to the current user input. The post-NLU ranker 1165 may also consider the ASR output data 910 to alter the NLU hypotheses confidence scores.

The orchestrator component 230 may, prior to sending the NLU results data 1185 to the post-NLU ranker 1165, associate intents in the NLU hypotheses with skills 290. For example, if a NLU hypothesis includes a <PlayMusic> intent, the orchestrator component 230 may associate the NLU hypothesis with one or more skills 290 that can execute the <PlayMusic> intent. Thus, the orchestrator component 230 may send the NLU results data 1185, including NLU hypotheses paired with skills 290, to the post-NLU ranker 1165. In response to ASR output data 910 corresponding to "what should I do for dinner today," the orchestrator component 230 may generates pairs of skills 290 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 1165 queries each skill 290, paired with a NLU hypothesis in the NLU output data 1185, to provide result data 1130 based on the NLU hypothesis with which it is associated. That is, with respect to each skill, the post-NLU ranker 1165 colloquially asks the each skill "if given this NLU hypothesis, what would you do with it." According to the above example, the post-NLU ranker 1165 may send skills 290 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 1165 may query each of the skills 290 in parallel or substantially in parallel.

A skill 290 may provide the post-NLU ranker 1165 with various data and indications in response to the post-NLU ranker 1165 soliciting the skill 290 for result data 1130. A skill 290 may simply provide the post-NLU ranker 1165 with an indication of whether or not the skill can execute with respect to the NLU hypothesis it received. A skill 290 may also or alternatively provide the post-NLU ranker 1165 with output data generated based on the NLU hypothesis it received. In some situations, a skill 290 may need further information in addition to what is represented in the received NLU hypothesis to provide output data responsive to the user input. In these situations, the skill 290 may provide the post-NLU ranker 1165 with result data 1130 indicating slots of a framework that the skill 290 further needs filled or entities that the skill 290 further needs resolved prior to the skill 290 being able to provided result data 1130 responsive to the user input. The skill 290 may also provide the post-NLU ranker 1165 with an instruction and/or computer-generated speech indicating how the skill 290 recommends the system solicit further information needed by the skill 290. The skill 290 may further provide the post-NLU ranker 1165 with an indication of whether the skill 290 will have all needed information after the user provides additional information a single time, or whether the skill 290 will need the user to provide various kinds of additional information prior to the skill 290 having all needed information. According to the above example, skills 290 may provide the post-NLU ranker 1165 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 1130 includes an indication provided by a skill 290 indicating whether or not the skill 290 can execute with respect to a NLU hypothesis; data generated by a skill 290 based on a NLU hypothesis; as well as an indication provided by a skill 290 indicating the skill 290 needs further information in addition to what is represented in the received NLU hypothesis.

The post-NLU ranker 1165 uses the result data 1130 provided by the skills 290 to alter the NLU processing confidence scores generated by the reranker 1190. That is, the post-NLU ranker 1165 uses the result data 1130 provided by the queried skills 290 to create larger differences between the NLU processing confidence scores generated by the reranker 1190. Without the post-NLU ranker 1165, the system may not be confident enough to determine an output in response to a user input, for example when the NLU hypotheses associated with multiple skills are too close for the system to confidently determine a single skill 290 to invoke to respond to the user input. For example, if the system does not implement the post-NLU ranker 1165, the system may not be able to determine whether to obtain output data from a general reference information skill or a medical information skill in response to a user input corresponding to "what is acne."

The post-NLU ranker 1165 may prefer skills 290 that provide result data 1130 responsive to NLU hypotheses over skills 290 that provide result data 1130 corresponding to an indication that further information is needed, as well as skills 290 that provide result data 1130 indicating they can provide multiple responses to received NLU hypotheses. For example, the post-NLU ranker 1165 may generate a first score for a first skill 290a that is greater than the first skill's NLU confidence score based on the first skill 290a providing result data 1130a including a response to a NLU hypothesis. For further example, the post-NLU ranker 1165 may generate a second score for a second skill 290b that is less than the second skill's NLU confidence score based on the second skill 290b providing result data 1130b indicating further information is needed for the second skill 290b to provide a response to a NLU hypothesis. Yet further, for example, the post-NLU ranker 1165 may generate a third score for a third skill 290c that is less than the third skill's NLU confidence score based on the third skill 290c providing result data 1130c indicating the third skill 290c can provide multiple responses to a NLU hypothesis.

The post-NLU ranker 1165 may consider other data 1120 in determining scores. The other data 1120 may include rankings associated with the queried skills 290. A ranking may be a system ranking or a user-specific ranking. A ranking may indicate a veracity of a skill from the perspective of one or more users of the system. For example, the post-NLU ranker 1165 may generate a first score for a first skill 290a that is greater than the first skill's NLU processing confidence score based on the first skill 290a being associated with a high ranking. For further example, the post-NLU ranker 1165 may generate a second score for a second skill 290b that is less than the second skill's NLU processing confidence score based on the second skill 290b being associated with a low ranking.

The other data 1120 may include information indicating whether or not the user that originated the user input has enabled one or more of the queried skills 290. For example, the post-NLU ranker 1165 may generate a first score for a first skill 290a that is greater than the first skill's NLU processing confidence score based on the first skill 290a being enabled by the user that originated the user input. For further example, the post-NLU ranker 1165 may generate a second score for a second skill 290b that is less than the second skill's NLU processing confidence score based on the second skill 290b not being enabled by the user that originated the user input. When the post-NLU ranker 1165 receives the NLU results data 1185, the post-NLU ranker 1165 may determine whether profile data, associated with the user and/or device that originated the user input, includes indications of enabled skills.

The other data 1120 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 1165 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 1165 may increase the NLU processing confidence score associated with a first skill configured to output visual data and/or decrease the NLU processing confidence score associated with a second skill configured to output audio data.

The other data 1120 may include information indicating the veracity of the result data 1130 provided by a skill 290. For example, if a user says "tell me a recipe for pasta sauce," a first skill 290a may provide the post-NLU ranker 1165 with first result data 1130a corresponding to a first recipe associated with a five star rating and a second skill 290b may provide the post-NLU ranker 1165 with second result data 1130b corresponding to a second recipe associated with a one star rating. In this situation, the post-NLU ranker 1165 may increase the NLU processing confidence score associated with the first skill 290a based on the first skill 290a providing the first result data 1130a associated with the five star rating and/or decrease the NLU processing confidence score associated with the second skill 290b based on the second skill 290b providing the second result data 1130b associated with the one star rating.

The other data 1120 may include information indicating the type of device that originated the user input. For example, the device may correspond to a "hotel room" type if the device is located in a hotel room. If a user inputs a command corresponding to "order me food" to the device located in the hotel room, the post-NLU ranker 1165 may increase the NLU processing confidence score associated with a first skill 290a corresponding to a room service skill associated with the hotel and/or decrease the NLU processing confidence score associated with a second skill 290b corresponding to a food skill not associated with the hotel.

The other data 1120 may include information indicating a location of the device and/or user that originated the user input. The system may be configured with skills 290 that may only operate with respect to certain geographic locations. For example, a user may provide a user input corresponding to "when is the next train to Portland." A first skill 290a may operate with respect to trains that arrive at, depart from, and pass through Portland, Oreg. A second skill 290b may operate with respect to trains that arrive at, depart from, and pass through Portland, Me. If the device and/or user that originated the user input is located in Seattle, Wash., the post-NLU ranker 1165 may increase the NLU processing confidence score associated with the first skill 290a and/or decrease the NLU processing confidence score associated with the second skill 290b. Likewise, if the device and/or user that originated the user input is located in Boston, Mass., the post-NLU ranker 1165 may increase the NLU processing confidence score associated with the second skill 290b and/or decrease the NLU processing confidence score associated with the first skill 290a.

The other data 1120 may include information indicating a time of day. The system may be configured with skills 290 that operate with respect to certain times of day. For example, a user may provide a user input corresponding to "order me food." A first skill 290a may generate first result data 1130a corresponding to breakfast. A second skill 290b may generate second result data 1130b corresponding to dinner. If the system(s) 120 receives the user input in the morning, the post-NLU ranker 1165 may increase the NLU processing confidence score associated with the first skill 290a and/or decrease the NLU processing score associated with the second skill 290b. If the system(s) 120 receives the user input in the afternoon or evening, the post-NLU ranker 1165 may increase the NLU processing confidence score associated with the second skill 290b and/or decrease the NLU processing confidence score associated with the first skill 290a.

The other data 1120 may include information indicating user preferences. The system may include multiple skills 290 configured to execute in substantially the same manner. For example, a first skill 290a and a second skill 290b may both be configured to order food from respective restaurants. The system may store a user preference (e.g., in the profile storage 270) that is associated with the user that provided the user input to the system(s) 120 as well as indicates the user prefers the first skill 290a over the second skill 290b. Thus, when the user provides a user input that may be executed by both the first skill 290a and the second skill 290b, the post-NLU ranker 1165 may increase the NLU processing confidence score associated with the first skill 290a and/or decrease the NLU processing confidence score associated with the second skill 290b.

The other data 1120 may include information indicating system usage history associated with the user that originated the user input. For example, the system usage history may indicate the user originates user inputs that invoke a first skill 290a more often than the user originates user inputs that invoke a second skill 290b. Based on this, if the present user input may be executed by both the first skill 290a and the second skill 290b, the post-NLU ranker 1165 may increase the NLU processing confidence score associated with the first skill 290a and/or decrease the NLU processing confidence score associated with the second skill 290b.

The other data 1120 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 1165 may increase the NLU processing confidence score associated with a first skill 290a that generates audio data. The post-NLU ranker 1165 may also or alternatively decrease the NLU processing confidence score associated with a second skill 290b that generates image data or video data.

The other data 1120 may include information indicating how long it took a skill 290 to provide result data 1130 to the post-NLU ranker 1165. When the post-NLU ranker 1165 multiple skills 290 for result data 1130, the skills 290 may respond to the queries at different speeds. The post-NLU ranker 1165 may implement a latency budget. For example, if the post-NLU ranker 1165 determines a skill 290 responds to the post-NLU ranker 1165 within a threshold amount of time from receiving a query from the post-NLU ranker 1165, the post-NLU ranker 1165 may increase the NLU processing confidence score associated with the skill 290. Conversely, if the post-NLU ranker 1165 determines a skill 290 does not respond to the post-NLU ranker 1165 within a threshold amount of time from receiving a query from the post-NLU ranker 1165, the post-NLU ranker 1165 may decrease the NLU processing confidence score associated with the skill 290.

It has been described that the post-NLU ranker 1165 uses the other data 1120 to increase and decrease NLU processing confidence scores associated with various skills 290 that the post-NLU ranker 1165 has already requested result data from. Alternatively, the post-NLU ranker 1165 may use the other data 1120 to determine which skills 290 to request result data from. For example, the post-NLU ranker 1165 may use the other data 1120 to increase and/or decrease NLU processing confidence scores associated with skills 290 associated with the NLU results data 1185 output by the NLU component 260. The post-NLU ranker 1165 may select n-number of top scoring altered NLU processing confidence scores. The post-NLU ranker 1165 may then request result data 1130 from only the skills 290 associated with the selected n-number of NLU processing confidence scores.

As described, the post-NLU ranker 1165 may request result data 1130 from all skills 290 associated with the NLU results data 1185 output by the NLU component 260. Alternatively, the system(s) 120 may prefer result data 1130 from skills implemented entirely by the system(s) 120 rather than skills at least partially implemented by the skill system(s) 225. Therefore, in the first instance, the post-NLU ranker 1165 may request result data 1130 from only skills associated with the NLU results data 1185 and entirely implemented by the system(s) 120. The post-NLU ranker 1165 may only request result data 1130 from skills associated with the NLU results data 1185, and at least partially implemented by the skill system(s) 225, if none of the skills, wholly implemented by the system(s) 120, provide the post-NLU ranker 1165 with result data 1130 indicating either data response to the NLU results data 1185, an indication that the skill can execute the user input, or an indication that further information is needed.

As indicated above, the post-NLU ranker 1165 may request result data 1130 from multiple skills 290. If one of the skills 290 provides result data 1130 indicating a response to a NLU hypothesis and the other skills provide result data 1130 indicating either they cannot execute or they need further information, the post-NLU ranker 1165 may select the result data 1130 including the response to the NLU hypothesis as the data to be output to the user. If more than one of the skills 290 provides result data 1130 indicating responses to NLU hypotheses, the post-NLU ranker 1165 may consider the other data 1120 to generate altered NLU processing confidence scores, and select the result data 1130 of the skill associated with the greatest score as the data to be output to the user.

A system that does not implement the post-NLU ranker 1165 may select the highest scored NLU hypothesis in the NLU results data 1185. The system may send the NLU hypothesis to a skill 290 associated therewith along with a request for output data. In some situations, the skill 290 may not be able to provide the system with output data. This results in the system indicating to the user that the user input could not be processed even though another skill associated with lower ranked NLU hypothesis could have provided output data responsive to the user input.

The post-NLU ranker 1165 reduces instances of the aforementioned situation. As described, the post-NLU ranker 1165 queries multiple skills associated with the NLU results data 1185 to provide result data 1130 to the post-NLU ranker 1165 prior to the post-NLU ranker 1165 ultimately determining the skill 290 to be invoked to respond to the user input. Some of the skills 290 may provide result data 1130 indicating responses to NLU hypotheses while other skills 290 may providing result data 1130 indicating the skills cannot provide responsive data. Whereas a system not implementing the post-NLU ranker 1165 may select one of the skills 290 that could not provide a response, the post-NLU ranker 1165 only selects a skill 290 that provides the post-NLU ranker 1165 with result data corresponding to a response, indicating further information is needed, or indicating multiple responses can be generated.

The post-NLU ranker 1165 may select result data 1130, associated with the skill 290 associated with the highest score, for output to the user. Alternatively, the post-NLU ranker 1165 may output ranked output data 1125 indicating skills 290 and their respective post-NLU ranker rankings. Since the post-NLU ranker 1165 receives result data 1130, potentially corresponding to a response to the user input, from the skills 290 prior to post-NLU ranker 1165 selecting one of the skills or outputting the ranked output data 1125, little to no latency occurs from the time skills provide result data 1130 and the time the system outputs responds to the user.

If the post-NLU ranker 1165 selects result audio data to be output to a user and the system determines content should be output audibly, the post-NLU ranker 1165 (or another component of the system(s) 120) may cause the device 110*a* and/or the device 110*b* to output audio corresponding to the result audio data. If the post-NLU ranker 1165 selects result text data to output to a user and the system determines content should be output visually, the post-NLU ranker 1165 (or another component of the system(s) 120) may cause the device 110*b* to display text corresponding to the result text data. If the post-NLU ranker 1165 selects result audio data to output to a user and the system determines content should be output visually, the post-NLU ranker 1165 (or another component of the system(s) 120) may send the result audio data to the ASR component 250. The ASR component 250 may generate output text data corresponding to the result audio data. The system(s) 120 may then cause the device 110*b* to display text corresponding to the output text data. If the post-NLU ranker 1165 selects result text data to output to a user and the system determines content should be output audibly, the post-NLU ranker 1165 (or another component of the system(s) 120) may send the result text data to the TTS component 280. The TTS component 280 may generate output audio data (corresponding to computer-generated speech) based on the result text data. The system(s) 120 may then cause the device 110*a* and/or the device 110*b* to output audio corresponding to the output audio data.

As described, a skill 290 may provide result data 1130 either indicating a response to the user input, indicating more information is needed for the skill 290 to provide a response to the user input, or indicating the skill 290 cannot provide a response to the user input. If the skill 290 associated with the highest post-NLU ranker score provides the post-NLU ranker 1165 with result data 1130 indicating a response to the user input, the post-NLU ranker 1165 (or another component of the system(s) 120, such as the orchestrator component 230) may simply cause content corresponding to the result data 1130 to be output to the user. For example, the post-NLU ranker 1165 may send the result data 1130 to the orchestrator component 230. The orchestrator component 230 may cause the result data 1130 to be sent to the device (110*a*/110*b*), which may output audio and/or display text corresponding to the result data 1130. The orchestrator component 230 may send the result data 1130 to the ASR component 250 to generate output text data and/or may send the result data 1130 to the TTS component 280 to generate output audio data, depending on the situation.

The skill 290 associated with the highest post-NLU ranker score may provide the post-NLU ranker 1165 with result data 1130 indicating more information is needed as well as instruction data. The instruction data may indicate how the skill 290 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110*a*/110*b*). When this occurs, the post-NLU ranker 1165 may simply cause the received instruction data be output by the device (110*a*/110*b*). Alternatively, the instruction data may be in a format that is not capable of being output by the device (110*a*/110*b*). When this occurs, the post-NLU ranker 1165 may cause the ASR component 250 or the TTS component 280 to process the instruction data, depending on the situation, to generate instruction data that may be output by the device (110*a*/110*b*). Once the user provides the system with all further information needed by the skill 290, the skill 290 may provide the system with result data 1130 indicating a response to the user input, which may be output by the system as detailed above.

The system may include "informational" skills 290 that simply provide the system with information, which the system outputs to the user. The system may also include "transactional" skills 290 that require a system instruction to execute the user input. Transactional skills 290 include ride sharing skills, flight booking skills, etc. A transactional skill 290 may simply provide the post-NLU ranker 1165 with result data 1130 indicating the transactional skill 290 can execute the user input. The post-NLU ranker 1165 may then cause the system to solicit the user for an indication that the system is permitted to cause the transactional skill 290 to execute the user input. The user-provided indication may be an audible indication or a tactile indication (e.g., activation of a virtual button or input of text via a virtual keyboard). In response to receiving the user-provided indication, the system may provide the transactional skill 290 with data corresponding to the indication. In response, the transactional skill 290 may execute the command (e.g., book a flight, book a train ticket, etc.). Thus, while the system may not further engage an informational skill 290 after the informational skill 290 provides the post-NLU ranker 1165 with result data 1130, the system may further engage a transactional skill 290 after the transactional skill 290 provides the post-NLU ranker 1165 with result data 1130 indicating the transactional skill 290 may execute the user input.

In some instances, the post-NLU ranker 1165 may generate respective scores for first and second skills that are too close (e.g., are not different by at least a threshold difference) for the post-NLU ranker 1165 to make a confident determination regarding which skill should execute the user input. When this occurs, the system may request the user indicate which skill the user prefers to execute the user input. The system may output TTS-generated speech to the user to solicit which skill the user wants to execute the user input.

Figure 12:
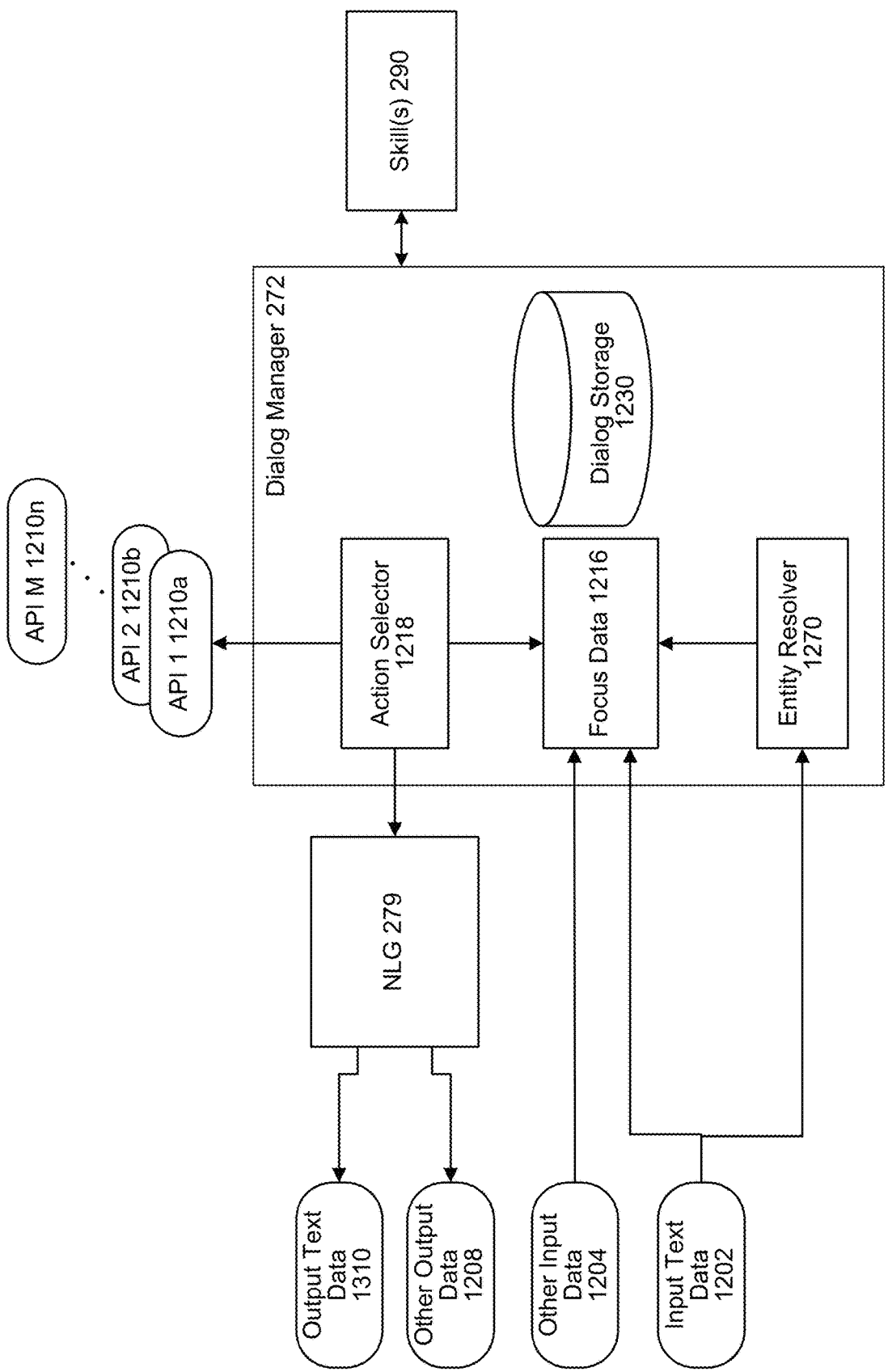
FIG. 12 is a conceptual diagram of components of a dialog manager component, according to embodiments of the present disclosure.

FIG. 12 illustrate operations to handle dialog management, according to embodiments of the present disclosure. One or more components shown in FIG. 12 may be part of the dialog manager component 272. For example, the dialog manager component 272 may include the entity resolver 1270, the focus data component 1216 and the action selector 1218. The dialog manager component 272 may work in concert with other language processing components, for example NLU 260, or may operate instead of such components in certain embodiments.

The system receives input text data 1202 which may be received, for example, by a device (e.g., 213) or from another component of the system (for example as ASR output data 910). The input text data 1202 may include text corresponding to a user input and metadata indicating further information about the text (such as an identity of the user for example determined by a user recognition component), an emotional state of the user (for example, as determined by a sentiment detection component, etc.). The input text data 1202 may be text representing words, instructions, markup language, speech, or gestures, or may be a vector or other representation of the same. The input text data 1202 may be generated by a user via a keyboard, touchscreen, microphone, camera, or other such input device. In other embodiments, the input text data 1202 is created using ASR, as described above, from audio data received from a user. The system may further receive other input data 1204, which may correspond to a button press, gesture, or other input, such as image data as may interpreted by device 110, system 120, or other component (for example an image processing component). As described in greater detail below, using the input text data 1202 and/or other input data 1204, the system may determine and output text data 1310 and/or other output data 1208. The system may instead or in addition perform an action based on the input text data 1202 and/or other input data 1204, such as calling one or more APIs 1210.

An entity resolver 1270 may be used to determine that the input text data 1202 includes a representation of one or more entities, a process that may include named entity recognition (NER)— i.e., determining that the input text data 1202 includes the representation—and entity resolution (ER)— i.e., identifying a meaning or context of the entity, such as associating an identity of a person based on a recognized nickname. An entity may be a person, place, thing, idea, and/or goal; example entities include proper names, nicknames, business names, place names, and/or application names. The entity resolver 1270 may operate similarly to NER component 1062 and/or entity resolution component 1170 discussed herein with regard to NLU operations.

In some embodiments, a single entity resolver 1270 is used for more than one domain (i.e., a "cross-domain" entity resolver 1270). Each domain may correspond to one or more dialog models. One or more candidate domains corresponding to the input text data 1202 may be determined; entity resolvers 1270 corresponding to the candidate domains may be used to process the input text data 1202. The dialog focus data 1216 may store the output entities from each candidate domain and may remove unselected entities when an API 1210 is selected or an action to be performed is determined.

The dialog focus data 1216 may store state data (for example in dialog storage 1230) corresponding to dialog history data (including an intent(s), an entity(ies), etc. corresponding to a prior turn in the dialog), action history data, and/or other data. In some embodiments, the other components (e.g., the action selector 1218) do not store state data and instead query the dialog focus data 1216 for the state data. The system may send some or all of the dialog focus data 1216 to other systems and/or may receive additional dialog focus data from other systems. In some embodiments, the other components (e.g., the action selector 1218) include a feature-extractor component to extract features from the dialog focus data 1216.

The dialog focus data 1216 may be graph-based data including a plurality of graph nodes; each graph node may correspond to an item of state data, such as an entity type, entity value, prior API call, and/or user data. The other components, such as the action selector 1218, may access all of the graph nodes of the dialog focus data 1216 or may access only a subset of the graph nodes of the dialog focus data 1216. The dialog focus data 1216 may be any type of storage mechanism and may serve as long-term and/or short term memory for the system, thus enabling tracking of entities, ASR output, TTS output, and other features) at each turn through a dialog. In some embodiments, the dialog focus data 1216 is updated after each turn of dialog with updated dialog focus data; in other embodiments, the dialog focus data 1216 is updated after an end of a dialog is determined.

The entity resolver 1270 may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain skills 290 (e.g., a shopping skill, a music skill, a video skill, etc.), or may be organized in a variety of other ways.

The entity resolver 1270 may include a ranker component. The ranker component may assign a particular confidence score to each hypothesis input therein. The confidence score of a hypothesis may represent a confidence of the system in the processing performed with respect to the hypothesis. The confidence score of a particular hypothesis may be affected by whether the hypothesis has unfilled slots. For example, if a hypothesis associated with a first skill component includes slots that are all filled/resolved, that NLU hypothesis may be assigned a higher confidence score than another hypothesis including at least some slots that are unfilled/unresolved by the entity resolver 1270.

The focus data 1216 may store data relevant to a dialog. In various embodiments, the dialog focus data 1216 stores the input text data 1202, other input data 1204, entity data from the entity resolver 1270 and/or action data and dialog data from an action selector 1218. The dialog focus data 1216 may further include additional information, such as location data, user preference data, and environment data. In various embodiments, the dialog focus data 1216 uses an encoder to encode some or all of the received data into one or more feature vectors and a decoder to determine, based on the feature vectors, intent data corresponding to an intent of a user. The dialog focus data 1216 may further include state data that represents prior dialog, actions, or other prior user information or data.

The action selector 1218 determines an action to be performed in response to the user request, where the action may include calling an API to perform an action and/or presenting an output to the user. The action selector 1218 may include a trained model(s), and may process the dialog focus data 1216. If the action selector 1218 determines to invoke an API call, one or more APIs 1210 may be activated and a corresponding action carried out. If the action selector 1218 determines to present a prompt or other output data to the user, the NLG component 279 may be used to generate the output text data 1310 and/or other output data 1208. In either case, the action selection 1218 may update the dialog focus data 1216 based on the API call or the output presented to the user.

In some embodiments, the action selector 1218 may process data from the dialog storage 1230 to select one or more skills 290/skill system(s) 225 capable of responding to the user request, and present the selected skill to the user using the output text data 1310.

In some embodiments, the system(s) 120 may determine past interaction data, such as a satisfaction rating corresponding to skill(s) 290 and store it in the storage 1230. The satisfaction rating may be based on past interactions between users of the system(s) 120 and the skill. In some embodiments, the system(s) 120 may determine a user-specific satisfaction rating corresponding to the skill based on user-specific data, interaction-specific data and/or focus data 1216 associated with the specific user, location data, past user interactions with the system(s) 120, past user interactions with the skill 290, user preferences, device type for the device 110 that received the user request, device type for the device 110 that may output/respond to the user request, device capabilities, dialog state of previous turns in the dialog, and other data.

In some embodiments, users may provide feedback to the system(s) 120 or the skill system(s) 225 indicating the user's satisfaction in the service skill responding to the user request/performing an action in response to the user request. The feedback may be solicited by the system(s) 120 or the skill system(s) 225. In some cases, the feedback may be explicit feedback and may be received as a voice input, text input, gestures, or other types of input. In other cases, the feedback may be implicit feedback and may be determined by processing data related to the user interaction, such as, image data representing the user's facial expression, audio data (representing an utterance from the user) indicating a sentiment/emotion of the user, text data (representing the user input) indicating a sentiment of the user, other sounds/speech indicating the user's emotions/feelings/sentiment (e.g., "ugh" indicating frustration), and other types of data.

The action selector 1218 may select a skill based on various other factors, including but not limited to, a user's age, user cohort (user affinities or other social organizations), location information (e.g., where the user input originated, where the user intends to travel to, etc.), skill location data, intent, intent type, time of day the user input is received, time of year the user input is received, and others.

The action selector 1218 may select a skill based on skill availability, for example, a reservations at a restaurant may indicate availability or no availability for a particular day. The system(s) 120/action selector 1218 may determine the number of diners at a restaurant or the number of takeout orders a restaurant is handling based on the number of user requests the system(s) 120 routed to the skill. In another example, the system(s) 120/action selector 1218 may determine that a number of user requests were routed to a first skill for a first location/geographic area (e.g., a city), and may determine to route the next/future user requests to another skill for that geographic area.

For a restaurant reservation, the action selector 1218 may select a skill based on a number of people in the user's party, since some restaurants may not make reservations for small parties less than a particular number. The action selector 1218 may select a skill based on person(s) other than the user that may be involved in the user request. For example, if the user says "Alexa, what should we do tomorrow?" the system(s) 120 may determine information relating to the other persons in the user's household to select a skill.

The action selector 1218 may select a skill based on the dialog state where the dialog state indicates multiple turns/attempts to recommend a skill/service provider, and the action selector 1218 may modify the search criteria (e.g., expand the zip code, expand the time frame, etc.) to select a skill.

Figure 13:
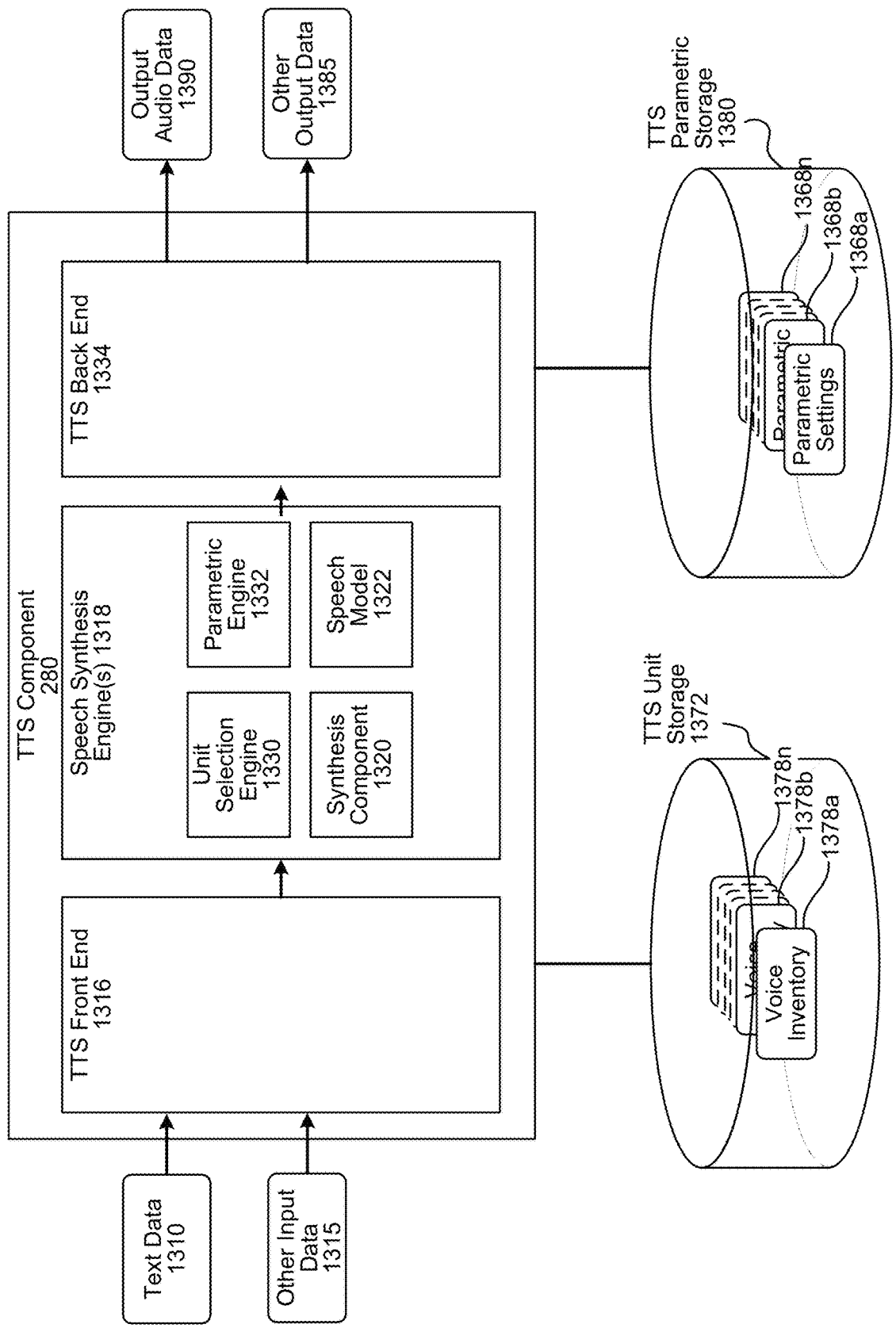
FIG. 13 is a conceptual diagram of text-to-speech components according to embodiments of the present disclosure.

Components of a system that may be used to perform unit selection, parametric TTS processing, and/or model-based audio synthesis are shown in FIG. 13. As shown in FIG. 13, the TTS component/processor 280 may include a TTS front end 1316, a speech synthesis engine 1318, TTS unit storage 1372, TTS parametric storage 1380, and a TTS back end 1334. The TTS unit storage 1372 may include, among other things, voice inventories 1378a-1378n that may include pre-recorded audio segments (called units) to be used by the unit selection engine 1330 when performing unit selection synthesis as described below. The TTS parametric storage 1380 may include, among other things, parametric settings 1368a-1368n that may be used by the parametric synthesis engine 1332 when performing parametric synthesis as described below. A particular set of parametric settings 1368 may correspond to a particular voice profile (e.g., whispered speech, excited speech, etc.).

In various embodiments of the present disclosure, model-based synthesis of audio data may be performed using by a speech model 1322 and a TTS front end 1316. The TTS front end 1316 may be the same as front ends used in traditional unit selection or parametric systems. In other embodiments, some or all of the components of the TTS front end 1316 are based on other trained models. The present disclosure is not, however, limited to any particular type of TTS front end 1316. The speech model 1322 may be used to synthesize speech without requiring the TTS unit storage 1372 or the TTS parametric storage 1380, as described in greater detail below.

TTS component receives text data 1310. Although the text data 1310 in FIG. 13 is input into the TTS component 280, it may be output by other component(s) (such as a skill 290, NLU component 260, NLG component 279 or other component) and may be intended for output by the system. Thus in certain instances text data 1310 may be referred to as "output text data." Further, the data 1310 may not necessarily be text, but may include other data (such as symbols, code, other data, etc.) that may reference text (such as an indicator of a word) that is to be synthesized. Thus data 1310 may come in a variety of forms. The TTS front end 1316 transforms the data 1310 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1318. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1310, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1316 may also process other input data 1315, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1310 and/or the text for a TTS request may be accompanied by separate metadata indicating what text should be whispered (or have some other indicated audio characteristic). The speech synthesis engine 1318 may compare the annotated phonetic units models and information stored in the TTS unit storage 1372 and/or TTS parametric storage 1380 for converting the input text into speech. The TTS front end 1316 and speech synthesis engine 1318 may include their own controller(s)/processor(s) and memory or they may use the controller/processor and memory of the server 120, device 110, or other device, for example. Similarly, the instructions for operating the TTS front end 1316 and speech synthesis engine 1318 may be located within the TTS component 280, within the memory and/or storage of the server 120, device 110, or within an external device.

Text data 1310 input into the TTS component 280 may be sent to the TTS front end 1316 for processing. The front end 1316 may include components for performing text normalization, linguistic analysis, linguistic prosody generation, or other such components. During text normalization, the TTS front end 1316 may first process the text input and generate standard text, converting such things as numbers, abbreviations (such as Apt., St., etc.), symbols ($, %, etc.) into the equivalent of written out words.

During linguistic analysis, the TTS front end 1316 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 280 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1372. The linguistic analysis performed by the TTS front end 1316 may also identify different grammatical components such as prefixes, suffixes, phrases, punctuation, syntactic boundaries, or the like. Such grammatical components may be used by the TTS component 280 to craft a natural-sounding audio waveform output. The language dictionary may also include letter-to-sound rules and other tools that may be used to pronounce previously unidentified words or letter combinations that may be encountered by the TTS component 280. Generally, the more information included in the language dictionary, the higher quality the speech output.

Based on the linguistic analysis the TTS front end 1316 may then perform linguistic prosody generation where the phonetic units are annotated with desired prosodic characteristics, also called acoustic features, which indicate how the desired phonetic units are to be pronounced in the eventual output speech. During this stage the TTS front end 1316 may consider and incorporate any prosodic annotations that accompanied the text input to the TTS component 280. Such acoustic features may include syllable-level features, word-level features, emotion, speaker, accent, language, pitch, energy, duration, and the like. Application of acoustic features may be based on prosodic models available to the TTS component 280. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1316, which may be referred to as a symbolic linguistic representation, may include a sequence of phonetic units annotated with prosodic characteristics. This symbolic linguistic representation may be sent to the speech synthesis engine 1318, which may also be known as a synthesizer, for conversion into an audio waveform of speech for output to an audio output device and eventually to a user. The speech synthesis engine 1318 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1318 may perform speech synthesis using one or more different methods. In one method of synthesis called unit selection, described further below, a unit selection engine 1330 matches the symbolic linguistic representation created by the TTS front end 1316 against a database of recorded speech, such as a database (e.g., TTS unit storage 1372) storing information regarding one or more voice corpuses (e.g., voice inventories 1378a-n). Each voice inventory may correspond to various segments of audio that was recorded by a speaking human, such as a voice actor, where the segments are stored in an individual inventory 1378 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short .wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1330 may then use the information about each unit to select units to be joined together to form the speech output.

The unit selection engine 1330 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1320) to form output audio data 1390 representing synthesized speech. Using all the information in the unit database, a unit selection engine 1330 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1332, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1320) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 280 may be configured to perform TTS processing in multiple languages. For each language, the TTS component 280 may include specially configured data, instructions and/or components to synthesize speech in the desired language(s). To improve performance, the TTS component 280 may revise/update the contents of the TTS unit storage 1372 based on feedback of the results of TTS processing, thus enabling the TTS component 280 to improve speech synthesis.

The TTS unit storage 1372 may be customized for an individual user based on his/her individualized desired speech output. In particular, the speech unit stored in a unit database may be taken from input audio data of the user speaking. For example, to create the customized speech output of the system, the system may be configured with multiple voice inventories 1378a-1378n, where each unit database is configured with a different "voice" to match desired speech qualities. Such voice inventories may also be linked to user accounts. The voice selected by the TTS component 280 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1378 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1368) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1330 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1330. As part of unit selection, the unit selection engine 1330 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1372 or in another storage component. For example, different unit selection databases may be stored in TTS unit storage 1372. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1318 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 280 may include an acoustic model, or other models, which may convert a symbolic linguistic representation into a synthetic acoustic waveform of the text input based on audio signal manipulation. The acoustic model includes rules which may be used by the parametric synthesis engine 1332 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1316.

The parametric synthesis engine 1332 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1318, the state may change or stay the same, based on the processing of the new text. For example, the pronunciation of a previously processed word might change based on later processed words. A Viterbi algorithm may be used to find the most likely sequence of states based on the processed text. The HMIs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1332 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1332 may lead to a number of potential audio output sequences. Based on the acoustic model and other potential models, the potential audio output sequences may be scored according to a confidence level of the parametric synthesis engine 1332. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1368, which may represent acoustic settings matching a particular parametric "voice", may be used by the synthesis component 1320 to ultimately create the output audio data 1390.

When performing unit selection, after a unit is selected by the unit selection engine 1330, the audio data corresponding to the unit may be passed to the synthesis component 1320. The synthesis component 1320 may then process the audio data of the unit to create modified audio data where the modified audio data reflects a desired audio quality. The synthesis component 1320 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 280. For each unit that corresponds to the selected portion, the synthesis component 1320 may process the audio data for that unit to create a modified unit audio data. The modified unit audio data may then be concatenated to form the output audio data 1390. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 280. In that case, other output data 1385 may be output along with the output audio data 1390 so that an ultimate playback device (e.g., device 110) receives instructions for playback that can assist in creating the desired output audio. Thus, the other output data 1385 may include instructions or other data indicating playback device settings (such as volume, playback rate, etc.) or other data indicating how output audio data including synthesized speech should be output. For example, for whispered speech, the output audio data 1390 may include other output data 1385 that may include a prosody tag or other indicator that instructs the device 110 to slow down the playback of the output audio data 1390, thus making the ultimate audio sound more like whispered speech, which is typically slower than normal speech. In another example, the other output data 1385 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 14:
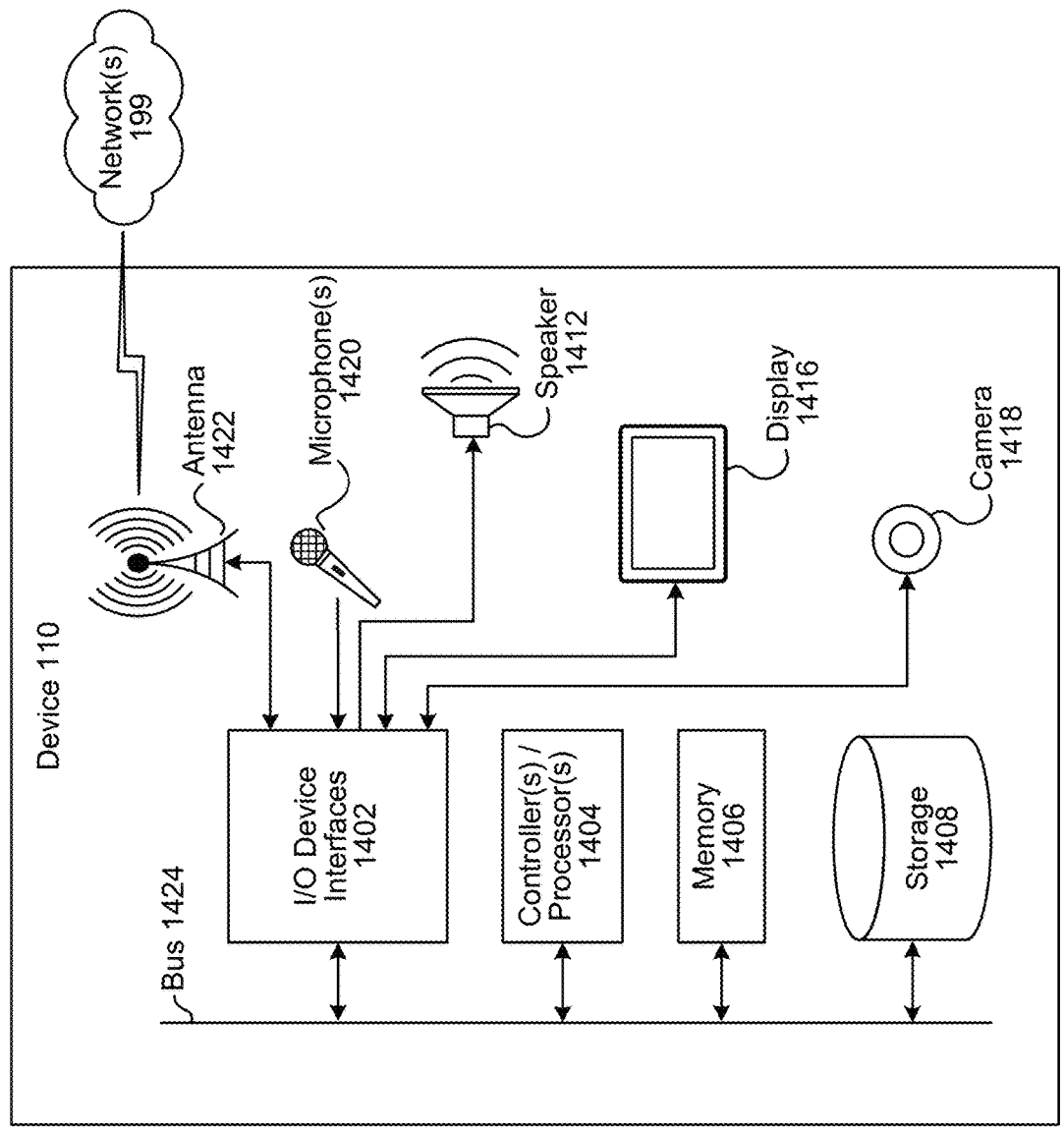
FIG. 14 is a block diagram conceptually illustrating example components of a device, according to embodiments of the present disclosure.

FIG. 14 is a block diagram conceptually illustrating a device 110 that may be used with the system. FIG. 15 is a block diagram conceptually illustrating example components of a remote device, such as the natural language command processing system 120, which may assist with ASR processing, NLU processing, etc., and a skill system 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

While the device 110 may operate locally to a user (e.g., within a same environment so the device may receive inputs and playback outputs for the user) the server/system 120 may be located remotely from the device 110 as its operations may not require proximity to the user. The server/system 120 may be located in an entirely different location from the device 110 (for example, as part of a cloud computing system or the like) or may be located in a same environment as the device 110 but physically separated therefrom (for example a home server or similar device that resides in a user's home or business but perhaps in a closet, basement, attic, or the like). One benefit to the server/system 120 being in a user's home/business is that data used to process a command/return a response may be kept within the user's home, thus reducing potential privacy concerns.

Multiple systems (120/225) may be included in the overall system 100 of the present disclosure, such as one or more natural language processing systems 120 for performing ASR processing, one or more natural language processing systems 120 for performing NLU processing, one or more skill systems 225, etc. In operation, each of these systems may include computer-readable and computer-executable instructions that reside on the respective device (120/225), as will be discussed further below.

Each of these devices (110/120/225) may include one or more controllers/processors (1404/1504), which may each include a central processing unit (CPU) for processing data and computer-readable instructions, and a memory (1406/1506) for storing data and instructions of the respective device. The memories (1406/1506) may individually include volatile random access memory (RAM), non-volatile read only memory (ROM), non-volatile magnetoresistive memory (MRAM), and/or other types of memory. Each device (110/120/225) may also include a data storage component (1408/1508) for storing data and controller/processor-executable instructions. Each data storage component (1408/1508) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1402/1502).

Computer instructions for operating each device (110/120/225) and its various components may be executed by the respective device's controller(s)/processor(s) (1404/1504), using the memory (1406/1506) as temporary "working" storage at runtime. A device's computer instructions may be stored in a non-transitory manner in non-volatile memory (1406/1506), storage (1408/1508), or an external device(s). Alternatively, some or all of the executable instructions may be embedded in hardware or firmware on the respective device in addition to or instead of software.

Each device (110/120/225) includes input/output device interfaces (1402/1502). A variety of components may be connected through the input/output device interfaces (1402/1502), as will be discussed further below. Additionally, each device (110/120/225) may include an address/data bus (1424/1524) for conveying data among components of the respective device. Each component within a device (110/120/225) may also be directly connected to other components in addition to (or instead of) being connected to other components across the bus (1424/1524).

Referring to FIG. 14, the device 110 may include input/output device interfaces 1402 that connect to a variety of components such as an audio output component such as a speaker 1412, a wired headset or a wireless headset (not illustrated), or other component capable of outputting audio. The device 110 may also include an audio capture component. The audio capture component may be, for example, a microphone 1420 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1416 for displaying content. The device 110 may further include a camera 1418.

Via antenna(s) 1422, the input/output device interfaces 1402 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1402/1502) may also include communication components that allow data to be exchanged between devices such as different physical servers in a collection of servers or other components.

The components of the device(s) 110, the natural language command processing system 120, or a skill system 225 may include their own dedicated processors, memory, and/or storage. Alternatively, one or more of the components of the device(s) 110, the natural language command processing system 120, or a skill system 225 may utilize the I/O interfaces (1402/1502), processor(s) (1404/1504), memory (1406/1506), and/or storage (1408/1508) of the device(s) 110, natural language command processing system 120, or the skill system 225, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system 225, as described herein, are illustrative, and may be located as a stand-alone device or may be included, in whole or in part, as a component of a larger device or system. As can be appreciated, a number of components may exist either on a system 120 and/or on device 110. For example, language processing components 292 (which may include ASR 250), language output components 293 (which may include NLG 279 and TTS 280), etc., for example as illustrated in FIG. 2. Unless expressly noted otherwise, the system version of such components may operate similarly to the device version of such components and thus the description of one version (e.g., the system version or the local version) applies to the description of the other version (e.g., the local version or system version) and vice-versa.

As illustrated in FIG. 16, multiple devices (110a-110n, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a first device, first audio data representing a first utterance of a user;
performing speech processing on the first audio data to determine first data representing a first action to be performed by a first skill;
in response to determining the first data, setting the first skill to be in an active state with respect to audio interactions via the first device;
storing second data indicating that the first skill is performing the first action;
sending, to a first component associated with the first skill, a first command to perform processing corresponding to the first data;
receiving, from the first component, first response data;
determining that the first skill is in the active state;
in response to determining that the first skill is in the active state, causing the first device to present a first output based on the first response data;
after causing the first device to present the first output, setting the first skill to be in an inactive state with respect to audio interactions via the first device, wherein the first component continues to perform the processing corresponding to the first data while in the inactive state;
after setting the first skill to be in an inactive state, receiving second audio data representing a second utterance of the user;
performing speech processing on the second audio data to determine third data representing a second action to be performed by a second skill different from the first skill;
in response to determining the third data, setting the second skill to be in the active state with respect to audio interactions via the first device;
sending, to a second component associated with the second skill, a second command to perform processing corresponding to the third data;
causing the first device to present a second output indicating that the second skill is to perform the second action;
after causing the first device to present the second output, receiving, from the first component, a first request to present a third output pertaining to the first action;
determining that the first skill is in the inactive state;
allowing, based at least on the second data, the first skill to resume the active state;
in response to allowing the first skill to resume the active state, causing presentation of the third output, wherein the third output includes synthesized speech representing a request for user input regarding the first action;
receiving third audio data representing a third utterance of the user;
performing speech processing on the third audio data to determine that the third utterance represents fourth data regarding the first action; and
sending, to the first component, the fourth data.

2. The computer-implemented method of claim 1, further comprising:
determining, upon receiving the first request, that the second skill is in the active state;
determining, based on metadata associated with the second skill, that the second skill is configured to allow interruptions by another skill; and in response to determining that the second skill is configured to allow interruptions, setting the second skill to be in an inactive state with respect to audio interactions via the first device,
   wherein allowing the first skill to resume the active state is further based on determining that the second skill is configured to allow interruptions.

3. The computer-implemented method of claim 1, further comprising:
   determining, upon receiving the first request, that the second skill is in the active state;
   determining, based on metadata associated with the second skill, that the second skill is configured to not allow interruptions by another skill;
   sending, to the first component, an indication that the first request is granted subject to completion of the second action;
   determining that the second skill has been set to the inactive state;
   in response to determining that the second skill has been set to the inactive state, sending, to the first component, an indication that the first skill may provide the third output; and
   receiving, from the first component, the third output;
      wherein causing presentation of the third output is further based on determining that the second skill has been set to the inactive state.

4. The computer-implemented method of claim 1, wherein:
   receiving, after setting the first skill to be in the inactive state, fifth data representing a wireless signal of a nearby device detected by the first device;
   identifying a second device using the fifth data;
   determining, based on metadata associated with the first skill, that the first skill has permission to receive device presence data; and
   in response to determining that the first skill has permission to receive device presence data, sending sixth data indicating a presence of the second device to the first component, wherein the first component determines, based on the sixth data, to request the user input regarding the first action.

5. A computer-implemented method comprising:
   receiving, by a first device, a first natural language input;
   performing natural language processing using the first natural language input to determine first data representing a first action to be performed by a first skill;
   in response to determining the first data, setting the first skill to be in an active state with respect to audio interactions via the first device;
   storing second data indicating that the first skill is performing the first action;
   sending the first data to the first skill;
   receiving, from the first skill, third data responsive to the first data;
   determining that the first skill is in the active state;
   in response to determining that the first skill is in the active state, causing the first device to present a first output based on the third data;
   after causing the first device to present the first output, setting the first skill to be in an inactive state with respect to audio interactions via the first device;
   receiving, from the first skill, fourth data representing a first request to present a second output regarding the first action;
   determining that the first skill is in the inactive state;
   allowing, based at least on the second data, the first skill to resume the active state; and
   in response to allowing the first skill to resume the active state, causing presentation of the second output.

6. The computer-implemented method of claim 5, further comprising:
   receiving a spoken response to the second output;
   performing speech processing on the spoken response to determine that the spoken response represents fifth data regarding the first action; and
   sending, to the first skill, the fifth data.

7. The computer-implemented method of claim 5, further comprising:
   determining, upon receiving the fourth data, that a second skill is in an active state with respect to audio interactions via the first device;
   in response to determining that the second skill is in the active state, denying the first request;
   receiving, subsequent to receiving the fourth data, fifth data representing a second request to present the second output; and
   determining, after receiving the fifth data, that the second skill is no longer in the active state,
      wherein allowing the first skill to resume the active state is additionally based on determining that the second skill is no longer in the active state.

8. The computer-implemented method of claim 5, further comprising:
   determining, upon receiving the fourth data, that a second skill is in an active state with respect to audio interactions via the first device;
   determining a first priority of the first request;
   determining a second priority of a second action being performed by the second skill; and
   determining, based on the first priority and the second priority, to grant the first request,
      wherein allowing the first skill to resume the active state is additionally based on the determination to grant the first request.

9. The computer-implemented method of claim 5, further comprising:
   receiving, after setting the first skill to be in the inactive state, fifth data representing detection, by the first device, of a second device in proximity to the first device;
   determining, based on metadata associated with the first skill, that the first skill has permission to receive device presence data; and
   in response to determining that the first skill has permission to receive device presence data, sending, to the first skill, sixth data indicating a presence of the second device,
      wherein the first skill determines, based on the sixth data, to send the first request.

10. The computer-implemented method of claim 5, further comprising:
   determining the first natural language input is associated with a user profile; and
   determining, upon receiving the fourth data, that the user profile is active with respect to a second device associated with the user profile, wherein causing presentation of the second output includes causing the second device to present the second output.

11. The computer-implemented method of claim 5, further comprising:
causing, in response to determining the first data, presentation of a first indication that the first output corresponds to the first skill;
causing, in response to setting a second skill to be in the active state, presentation of a second indication that a third output corresponds to the second skill; and
causing, in response to allowing the first skill to resume the active state, presentation of a third indication that the second output corresponds to the first skill.

12. The computer-implemented method of claim 5, wherein the first skill sends the fourth data in response to new data received by the first skill while in the inactive state.

13. A system, comprising:
at least one processor; and
at least one memory comprising instructions that, when executed by the at least one processor, cause the system to:
receive, by a first device, a first natural language input;
perform natural language processing using the first natural language input to determine first data representing a first action to be performed by a first skill;
in response to determining the first data, set the first skill to be in an active state with respect to audio interactions via the first device;
store second data indicating that the first skill is performing the first action;
send the first data to the first skill;
receive, from the first skill, third data responsive to the first data;
determine that the first skill is in the active state;
in response to determining that the first skill is in the active state, cause the first device to present a first output based on the third data;
after causing the first device to present the first output, set the first skill to be in an inactive state with respect to audio interactions via the first device;
receive, from the first skill, fourth data representing a first request to present a second output regarding the first action;
determine that the first skill is in the inactive state;
allow, based at least on the second data, the first skill to resume the active state; and
in response to allowing the first skill to resume the active state, cause presentation of the second output.

14. The system of claim 13, wherein the at least one memory further comprises instructions that, when executed by the at least one processor, further cause the system to:
receive a spoken response to the second output;
perform speech processing on the spoken response to determine that the spoken response represents fifth data regarding the first action; and
send, to the first skill, the fifth data.

15. The system of claim 13, wherein the at least one memory further comprises instructions that, when executed by the at least one processor, further cause the system to:
determine, upon receiving the fourth data, that a second skill is in an active state with respect to audio interactions via the first device;
in response to determining that the second skill is in the active state, deny the first request;
receive, subsequent to receiving the fourth data, fifth data representing a second request to present the second output; and
determine, after receiving the fifth data, that the second skill is no longer in the active state,
wherein allowing the first skill to resume the active state is additionally based on determining that the second skill is no longer in the active state.

16. The system of claim 13, wherein the at least one memory further comprises instructions that, when executed by the at least one processor, further cause the system to:
determine, upon receiving the fourth data, that a second skill is in an active state with respect to audio interactions via the first device;
determine a first priority of the first request;
determine a second priority of a second action being performed by the second skill; and
determine, based on the first priority and the second priority, to grant the first request,
wherein allowing the first skill to resume the active state is additionally based on the determination to grant the first request.

17. The system of claim 13, wherein the at least one memory further comprises instructions that, when executed by the at least one processor, further cause the system to:
receive, after setting the first skill to be in the inactive state, fifth data representing detection, by the first device, of a second device in proximity to the first device;
determine, based on metadata associated with the first skill, that the first skill has permission to receive device presence data; and
in response to determining that the first skill has permission to receive device presence data, send, to the first skill, sixth data indicating a presence of the second device,
wherein the first skill determines, based on the sixth data, to send the first request.

18. The system of claim 13, wherein the at least one memory further comprises instructions that, when executed by the at least one processor, further cause the system to:
determine the first natural language input is associated with a user profile; and
determine, upon receiving the fourth data, that the user profile is active with respect to a second device associated with the user profile,
wherein causing presentation of the second output includes causing the second device to present the second output.

19. The system of claim 13, wherein the at least one memory further comprises instructions that, when executed by the at least one processor, further cause the system to:
cause, in response to determining the first data, presentation of a first indication that the first output corresponds to the first skill;
cause, in response to setting a second skill to be in the active state, presentation of a second indication that a third output corresponds to the second skill; and
cause, in response to allowing the first skill to resume the active state, presentation of a third indication that the second output corresponds to the first skill.

20. The system of claim 13, wherein the first skill sends the fourth data in response to new data received by the first skill while in the inactive state.

* * * * *